US009678245B2

(12) United States Patent
Tanaka et al.

(10) Patent No.: US 9,678,245 B2
(45) Date of Patent: Jun. 13, 2017

(54) POLYCARBONATE RESIN FILM, AND TRANSPARENT FILM AND PROCESS FOR PRODUCING THE SAME

(75) Inventors: Tomohiko Tanaka, Kitakyushu (JP); Michiaki Fuji, Yokkaichi (JP); Nao Murakami, Ibaraki (JP); Takashi Shimizu, Ibaraki (JP)

(73) Assignees: MITSUBISHI CHEMICAL CORPORATION, Tokyo (JP); NITTO DENKO CORPORATION, Ibaraki-shi (JP)

(*) Notice: Subject to any disclaimer, the term of this patent is extended or adjusted under 35 U.S.C. 154(b) by 700 days.

(21) Appl. No.: 13/475,435

(22) Filed: May 18, 2012

(65) Prior Publication Data

US 2012/0231255 A1    Sep. 13, 2012

Related U.S. Application Data

(63) Continuation of application No. PCT/JP2010/070609, filed on Nov. 18, 2010.

(30) Foreign Application Priority Data

Nov. 19, 2009 (JP) .................. 2009-264337
May 27, 2010 (JP) .................. 2010-121985
Jun. 30, 2010 (JP) .................. 2010-149799

(51) Int. Cl.
*B32B 27/36* (2006.01)
*C08G 64/06* (2006.01)
*G02B 1/04* (2006.01)
*C08J 5/18* (2006.01)
*G02B 5/30* (2006.01)
*G02F 1/13363* (2006.01)

(52) U.S. Cl.
CPC .............. *G02B 1/04* (2013.01); *B32B 27/365* (2013.01); *C08J 5/18* (2013.01); *C08J 2369/00* (2013.01); *G02B 5/3033* (2013.01); *G02F 1/13363* (2013.01); *G02F 2202/022* (2013.01); *Y10T 428/31507* (2015.04)

(58) Field of Classification Search
None
See application file for complete search history.

(56) References Cited

U.S. PATENT DOCUMENTS

| 5,245,456 | A | * | 9/1993 | Yoshimi et al. .............. 349/118 |
| 5,658,505 | A | | 8/1997 | Shimizu et al. |
| 5,888,634 | A | | 3/1999 | Shimizu et al. |
| 7,365,148 | B2 | | 4/2008 | Ono et al. |
| 2006/0115610 | A1 | | 6/2006 | Nagashima |
| 2009/0195877 | A1 | | 8/2009 | Nakai |
| 2010/0190953 | A1 | * | 7/2010 | Fuji et al. .................. 528/370 |

| 2010/0196720 | A1 | 8/2010 | Kato et al. |
| 2011/0003101 | A1 | 1/2011 | Fuji et al. |
| 2012/0231255 | A1 | 9/2012 | Tanaka et al. |

FOREIGN PATENT DOCUMENTS

| CN | 104341587 A | 2/2015 | |
| EP | 2 678 616 A1 | 5/2011 | |
| GB | 1079686 | 8/1967 | |
| JP | 02-059703 A | 2/1990 | |
| JP | 2002-258045 A | 9/2002 | |
| JP | 2004-67990 A | 3/2004 | |
| JP | 2004-078247 A | 3/2004 | |
| JP | 2005-31610 A | 2/2005 | |
| JP | 2005-107099 A | 4/2005 | |
| JP | 2005-146140 A | 6/2005 | |
| JP | 2006-028441 | 2/2006 | |
| JP | 2006-28441 A | 2/2006 | |
| JP | 2006-182020 A | 7/2006 | |
| JP | 2006-224517 A | 8/2006 | |
| JP | 2009-161746 A | 7/2009 | |
| JP | 2009-181056 A | 8/2009 | |
| JP | 2011-021172 | 2/2011 | |
| JP | 2011-21172 A | 2/2011 | |
| JP | 5448264 B2 | 3/2014 | |
| TW | 200628511 | 8/2006 | |
| WO | WO 2004/111106 | 12/2004 | |
| WO | WO 2007148604 A1 * | 12/2007 | .............. C08G 64/02 |

(Continued)

OTHER PUBLICATIONS

Submission of Information issued Sep. 25, 2012 in Japanese Patent Application No. 2010-257074 with English Translation.
Office Action issued Oct. 23, 2012 in Japanese Patent Application No. 2010-257074 with English Translation.
International Search Report issued Feb. 22, 2011 in PCT/JP2010/070609 filed Nov. 18, 2010.
Office Action issued Dec. 6, 2011, in Japanese Patent Application No. 2010-257074 with English translation.
Office Action issued May 15, 2012, in Japanese Patent Application No. 2010-257074 with English translation.
Extended European Search Report issued Jan. 25, 2016 in corresponding European Patent Application No. 10831632.4.
Office Action issued Mar. 18, 2016 in corresponding Taiwanese Patent Application No. 104127912, filed Nov. 19, 2010, with English translation.
Office Action issue Aug. 26, 2014 in Japanese Patent Application No. 2012-046681 filed Mar. 2, 2012 with English Translation.

(Continued)

*Primary Examiner* — Prashant J Khatri
(74) *Attorney, Agent, or Firm* — Oblon, McClelland, Maier & Neustadt, L.L.P.

(57) ABSTRACT

A polycarbonate resin film of the present invention is formed from a polycarbonate resin which contains at least a constitutional unit derived from a dihydroxy compound having a bonded structure represented by the following structural formula (1) and satisfies the following expression (2) when subjected to a tensile test at a standard stretching temperature for the polycarbonate resin and at a pulling speed (strain rate) of 1,000%/min.

[Chem. 1]

$$-\!\!\!-\!\mathrm{CH_2}\!\!-\!\mathrm{O}\!-\!\!\!-\!\!\!\!\qquad(1)$$

(No hydrogen atom is bonded to the oxygen atom contained in the structural formula (1).)

$$0.9 \leq [(\text{lower yield stress in tension})/(\text{upper yield stress in tension})] \leq 1 \qquad (2).$$

17 Claims, No Drawings

(56) References Cited

FOREIGN PATENT DOCUMENTS

WO    WO 2008/020636    2/2008
WO    WO 2010/061927    6/2010

OTHER PUBLICATIONS

Office Action issued on Nov. 24, 2014, in the corresponding Taiwanese patent application and English Translation.
Chinese Office Action issued Jan. 8, 2014 in Application No. 201080051967.2 with English Translation.

* cited by examiner

POLYCARBONATE RESIN FILM, AND TRANSPARENT FILM AND PROCESS FOR PRODUCING THE SAME

TECHNICAL FIELD

The present invention relates to a polycarbonate resin film for film stretching which is a film formed from a polycarbonate resin containing a constitutional unit derived from a dihydroxy compound having a specific bonded structure and which has excellent heat resistance and mechanical properties and gives a stretched film reduced in thickness unevenness. The invention further relates to a transparent film (i.e., stretched film) obtained by stretching the polycarbonate resin film and a process for producing the transparent film.

BACKGROUND ART

The transparent films to be used as optical films represented by retardation films which are in use as optical compensation films for liquid-crystal displays and the like are required to have thickness evenness as well as transparency. In optical compensation films, for example, high thickness unevenness results in an increase in unevenness of phase retardation, which is the product of birefringence and thickness, making it impossible to perform even optical compensation throughout the whole display screen. There has hence been a problem that display devices having excellent display quality including viewing angle characteristics cannot be obtained. In addition, the areas of retardation films are increasing in recent years with the size increase in liquid-crystal displays, and a reduction in thickness unevenness is effective also in improving yield. In particular, when a film is produced through a stretching step, there are the cases where partial stretching occurs to give a thin central part and thick edge parts, resulting in an increased difference in thickness between the central part and the edge parts. A more even film has hence been desired.

Since polycarbonate resins are transparent, there is the possibility of industrially utilizing polycarbonate resins as optical films. Polycarbonate resins are generally produced from starting materials induced from petroleum resources. In recent years, there is a fear about depletion of petroleum resources, and it is desired to supply a polycarbonate produced from a starting material obtained from biomass resources such as plants. Furthermore, since there is a fear about climate changes and the like which are brought about by the global warming caused by increases in carbon dioxide emission and by accumulation thereof, there is a need for the development of a polycarbonate which is produced using a plant-derived monomer as a starting material and which is carbon-neutral even when discarded after use. A technique has hitherto been proposed in which isosorbide is used as a plant-derived monomer to obtain a polycarbonate resin through transesterification with diphenyl carbonate (see, for example, patent document 1). However, the polycarbonate obtained is brown and is not satisfactory when used as an optical film. Meanwhile, it has been attempted to mitigate the stiffness of an isosorbide-based homopolycarbonate, without impairing the optical properties thereof, by copolymerizing isosorbide with a linear aliphatic diol (see, for example, patent documents 2 and 3). Furthermore, a technique is known in which heat resistance and mechanical strength are improved by copolymerizing isosorbide and an alicyclic diol.

However, there has been no knowledge about any technique for inhibiting a polycarbonate resin containing a constitutional unit derived from a dihydroxy compound having a specific bonded structure, such as, for example, isosorbide, which is known as a plant-derived monomer, from suffering thickness unevenness when stretched.

PRIOR-ART DOCUMENTS

Patent Documents

Patent Document 1: British Patent No. 1,079,686, specification
Patent Document 2: JP-A-2006-028441
Patent Document 3: International Publication No. 2008/020636

SUMMARY OF THE INVENTION

Problems that the Invention is to Solve

Subjects for the invention are to provide a polycarbonate resin film formed from a polycarbonate resin which contains a constitutional unit derived from a dihydroxy compound that has a bonded structure represented by the following structural formula (1), the polycarbonate resin film being free from the problems of related-art techniques described above, having excellent mechanical strength and heat resistance, and giving a stretched film reduced in thickness unevenness, and to provide a transparent film reduced in thickness unevenness and a process for producing the transparent film.

Means for Solving the Problems

The present inventors diligently made investigations in order to overcome the problems described above. As a result, the inventors have found that the problems can be eliminated with a film of a polycarbonate resin which contains at least a constitutional unit derived from a dihydroxy compound having a specific bonded structure, by regulating the film so as to have specific mechanical properties. The invention has been thus completed.

Namely, the invention provides a polycarbonate resin film for film stretching, comprising: a polycarbonate resin which contains at least a constitutional unit derived from a dihydroxy compound that has a bonded structure represented by a structural formula (1), wherein the polycarbonate resin film satisfies an expression (2) when subjected to a tensile test at a standard stretching temperature for the polycarbonate resin and at a pulling speed (i.e., strain rate) of 1,000%/min.

[Chem. 1]

$$\mathrm{\{CH_2\text{—}O\}} \tag{1}$$

(No hydrogen atom is bonded to the oxygen atom contained in the structural formula (1).)

$$0.9 \leq [(\text{lower yield stress in tension})/(\text{upper yield stress in tension})] \leq 1 \tag{2}$$

It is preferred that the polycarbonate resin film should satisfy an expression (3), when subjected to a tensile test at the standard stretching temperature for the polycarbonate resin and at a pulling speed (strain rate) of 1,000%/min, and that the dihydroxy compound having a bonded structure represented by the structural formula (1) should be a compound represented by a structural formula (4).

[(Breaking stress in tension)/(upper yield stress in tension)]≥1 (3)

[Chem. 2]

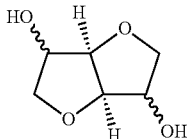

(4)

It is more preferred that the polycarbonate resin which contains at least a constitutional unit derived from a dihydroxy compound having a bonded structure represented by the structural formula (1) should have a storage modulus at 40° C. of 2.7 GPa or less. It is even more preferred that the polycarbonate resin which contains at least a constitutional unit derived from a dihydroxy compound having a bonded structure represented by the structural formula (1) should be a copolymer which contains a constitutional unit derived from a compound represented by the structural formula (4) and a constitutional unit derived from 1,4-cyclohexanedimethanol.

Another essential point of the invention resides in a process for producing a transparent film comprising: stretching a film in at least one direction under a condition(s) that satisfies an expression (5), wherein the film comprises a polycarbonate resin which contains at least a constitutional unit derived from a dihydroxy compound that has a bonded structure represented by a structural formula (1).

[Chem. 3]

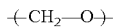 (1)

(No hydrogen atom is bonded to the oxygen atom contained in the structural formula (1).)

200%/min≤[stretching speed(strain rate)]≤1,200%/min (5)

Effects of the Invention

According to the invention, it is possible to provide a polycarbonate resin film capable of forming a transparent film (stretched film) which is excellent in terms of transparency, color tone, heat resistance, formability, and mechanical strength, is reduced in film thickness unevenness, and has excellent optical properties. According to the production process of the invention, a transparent film reduced in thickness unevenness can be stably produced.

The transparent film reduced in thickness unevenness can be attained by producing a stretched film using as a raw material the polycarbonate resin film of the invention, which has the properties described above that are determined through a special tensile test. Alternatively, even when a polycarbonate resin film which does not have the properties described above that are determined through a special tensile test is used as a raw material, the transparent film reduced in thickness unevenness can be attained by producing the transparent film using the production process of the invention, in which the specific stretching conditions described above are employed. It is most preferred to satisfy both requirements and to practice the production process of the invention using the polycarbonate resin film of the invention. In this case, a transparent film having reduced thickness unevenness can be more reliably obtained.

MODES FOR CARRYING OUT THE INVENTION

Embodiments of the invention will be explained below in detail. The following explanations on constituent elements are for embodiments (i.e., representative embodiments) of the invention, and the invention should not be construed as being limited to the embodiments unless the invention departs from the spirit thereof.

The polycarbonate resin film according to the invention is a film formed from a polycarbonate resin containing at least a constitutional unit derived from a dihydroxy compound having a bonded structure represented by the following structural formula (1), and satisfies the following expression (2) when subjected to a tensile test at a standard stretching temperature for the polycarbonate resin and at a pulling speed (strain rate) of 1,000%/min. However, no hydrogen atom is bonded to the oxygen atom contained in the structural formula (1).

[Chem. 4]

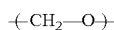 (1)

0.9≤[(lower yield stress in tension)/(upper yield stress in tension)]≤1 (2)

<Polycarbonate Resin Film>

The polycarbonate resin film of the invention is a film which has been formed using, as a raw material, a polycarbonate resin containing at least a constitutional unit derived from a dihydroxy compound having a specific bonded structure, i.e., a bonded structure represented by the structural formula (1), and which has specific properties.

Upper Yield Stress in Tension and Lower Yield Stress in Tension

The polycarbonate resin film of the invention is a film in which the upper yield stress in tension and lower yield stress in tension thereof have a relationship which is in the specific range represented by the following expression (2). By regulating the relationship thereof so as to satisfy the specific range, a polycarbonate resin film which is excellent in terms of mechanical strength, mechanical properties, and transparency and which has reduced thickness unevenness after stretching can be obtained. A method for measuring the upper yield stress in tension and the lower yield stress in tension will be described later in the section Examples.

0.9≤[(lower yield stress in tension)/(upper yield stress in tension)]≤1 (2)

A polycarbonate resin film which satisfies the relationship between upper yield stress in tension and lower yield stress in tension that is specified in the invention can be obtained by employing a polycarbonate resin having the specific structure specified in the invention and, in addition thereto, by employing a suitable combination of means, such as suitably regulating the molecular weight thereof, suitably selecting constitutional units thereof, regulating the proportions of the constitutional units, adding a plasticizer to the polycarbonate resin, etc., or by selecting adequate film formation conditions and stretching conditions.

Breaking Stress in Tension and Upper Yield Stress in Tension

From the standpoint of obtaining a polycarbonate resin film which has further reduced thickness unevenness after stretching, it is preferred that the upper yield stress in tension and breaking stress in tension of the film should have a relationship which is in the specific range represented by the following expression (3). By regulating the relationship thereof so as to satisfy the specific range, a polycarbonate resin film which is further reduced in thickness unevenness can be obtained. A method for measuring the breaking stress in tension will be described later in the section Examples.

$$[(\text{Breaking stress in tension})/(\text{upper yield stress in tension})] \geq 1 \quad (3)$$

A polycarbonate resin film which satisfies the relationship between upper yield stress in tension and breaking stress in tension that is specified in the invention can be obtained by employing a polycarbonate resin having the specific structure specified in the invention and, in addition thereto, by employing a suitable combination of means, such as suitably regulating the molecular weight thereof, suitably selecting constitutional units thereof, regulating the proportions of the constitutional units, adding a plasticizer to the polycarbonate resin, etc., or by selecting adequate film formation conditions and stretching conditions.

Storage Modulus

Furthermore, from the standpoint of obtaining a polycarbonate resin film which has further reduced thickness unevenness after stretching, it is preferred that the storage modulus at 40° C. of the polycarbonate resin having the specific structure specified in the invention should be 2.7 GPa or less. By regulating the storage modulus thereof so as to satisfy the specific range, a polycarbonate resin film which is further reduced in thickness unevenness can be obtained. A method for determining the storage modulus will be described later in the section Examples.

A polycarbonate resin film which has a storage modulus within the specific range specified in the invention can be obtained by employing a polycarbonate resin having the specific structure specified in the invention and, in addition thereto, by employing a suitable combination of means, such as suitably regulating the melt viscosity thereof, suitably selecting constitutional units thereof, regulating the proportions of the constitutional units, adding a plasticizer to the polycarbonate resin, etc., or by selecting adequate film formation conditions and stretching conditions.

Process for Producing the Polycarbonate Resin Film

A polycarbonate resin such as the polycarbonate resin which will be described later in the section <Polycarbonate Resin> is used as a raw material, and this polycarbonate resin is formed into a film using a suitable combination of means, such as suitably regulating the melt viscosity of the polycarbonate resin, suitably selecting constitutional units thereof, regulating the proportions of the constitutional units, using a specific stretching speed when the polycarbonate resin is stretched to produce the polycarbonate resin film, conducting the stretching for film formation at a specific temperature, adding a plasticizer to the polycarbonate resin, etc. Thus, the polycarbonate resin film of the invention can be produced.

Techniques for film formation to be used in this case are not particularly limited, and known film formation techniques can be used. Examples thereof include melt extrusion, T-die molding, inflation molding, calendering, solution casting, flow casting, and hot pressing. Preferred examples thereof include T-die molding, inflation molding, and flow casting. The film or sheet thus obtained can be stretched after the formation thereof, thereby producing the desired film.

The raw material for the polycarbonate resin film of the invention may be a composition of the polycarbonate resin according to the invention which will be described later with one or more of the following resins so long as use of the composition does not defeat the objects of the invention: resins such as other polycarbonate resins, e.g., bisphenol A and bisphenol Z, polycarbonate and polyester resins which have been modified with 9,9-bis(4-hydroxyphenyl)fluorene, 9,9-bis(3-methyl-4-hydroxyphenyl)fluorene, 9,9-bis(3-ethyl-4-hydroxyphenyefluorene, or the like, and polyester resins such as poly(ethylene terephthalate), poly(butylene terephthalate), poly(naphthalenedicarboxylate), poly(cyclohexanedimethylene-cyclohexanedicarboxylate), and poly(cyclohexanedimethylene terephthalate).

The thickness of the polycarbonate resin film formed is generally 20-200 μm, preferably 50-150 μm. In the case where the film formed is to be used as, for example, a retardation film, the thickness thereof is generally 10-200 μm, preferably 30-150 μm. The polycarbonate resin film formed has a value of retardation of preferably 20 nm or less, more preferably 10 nm or less. In the case where the retardation value of the film is larger than that value, there is a possibility that this film, through stretching, might give a retardation film which has enhanced unevenness in in-plane retardation value.

Methods for Stretching the Polycarbonate Resin Film

The transparent film of the invention may be obtained by stretching, in at least one direction, a polycarbonate resin film formed from a polycarbonate resin having a bonded structure represented by the structural formula (1). For stretching the polycarbonate resin film, use can be made of known stretching techniques such as, for example, uniaxial stretching in which the film is stretched in either the machine direction or the transverse direction or biaxial stretching in which the film is stretched in both the machine and transverse directions. It is also possible to subject the film to special biaxial stretching, such as the biaxial stretching shown in JP-A-5-157911, to regulate the three-dimensional refractive indexes of the film.

With respect to stretching conditions which can be employed when the transparent film of the invention is produced, it is preferred to conduct the stretching at a temperature in the range of from (glass transition temperature of the raw material for the film)−20° C. to (the glass transition temperature)+40° C. More preferably, the stretching temperature is in the range of from (glass transition temperature of the raw material for the film)−10° C. to (the glass transition temperature)+20° C.

From the standpoint of obtaining a transparent film having reduced thickness unevenness, the stretching speed is 200-1,200%/min in terms of stretching-direction length based on the unstretched film. The stretching speed is preferably 300% or higher, more preferably 400% or higher, and is preferably 1,100% or less, more preferably 1,000% or less.

The stretch ratio of the film is determined in order to attain desired mechanical properties or, in the case of use as, for example, a retardation film, in order to obtain a desired retardation value. However, in the case of machine-direction uniaxial stretching, the stretch ratio is generally 1.05-4, preferably 1.1-3. The polycarbonate resin film thus stretched may be allowed to cool as such at room temperature. It is, however, preferred that the stretched polycarbonate resin film should be held in an atmosphere having a temperature of from (the glass transition temperature)−20° C. to (the glass transition temperature)+40° C. for at least 10 seconds, preferably 1 minute or longer, more preferably 10-60 minutes, to thereby heat-set the film and then cooled to room temperature. Thus, a transparent film which stably has various properties and which has reduced thickness unevenness can be obtained.

It is preferred that the transparent film obtained by molding the polycarbonate resin film of the invention should have a birefringence of 0.001 or higher. From the standpoint of designing the transparent film to have an exceedingly small thickness, a higher birefringence is preferred. Consequently, the birefringence thereof is more preferably 0.002 or higher. In the case where the birefringence thereof is less than 0.001, it is necessary to excessively increase the film thickness and the material hence is required to be used in a larger amount, making it difficult to control the homogeneity in terms of thickness, transparency, and retardation. Because of this, there is a possibility that the transparent film having a birefringence less than 0.001 cannot be applied to appliances required to be precise, thin, and homogeneous.

When properties of the polycarbonate resin film of the invention are to be evaluated, it is preferred to evaluate the properties thereof in terms of the birefringence ($\Delta n2$) of a film obtained therefrom through stretching conducted in a free-end stretch ratio of 2.0 under the conditions of (standard stretching temperature for the polycarbonate resin)+5° C. By evaluating the birefringence ($\Delta n2$) of the film obtained under those conditions, the birefringence of the film in the state of having been highly oriented by stretching can be determined. There hence is a merit that the properties of the polycarbonate resin film can be evaluated without impairing the orientation properties inherent in the material.

It is preferred that the transparent film obtained by molding the polycarbonate resin film of the invention should have a refractive index, as measured with sodium d-line (589 nm), of 1.57-1.62. In the case where this refractive index thereof is lower than 1.57, there is a possibility that this film might have too low birefringence. On the other hand, in the case where the refractive index thereof exceeds 1.62, there is a possibility that this film might have an increased reflectance and reduced light transmission properties.

In the transparent film, the ratio of the retardation R450 measured at a wavelength of 450 nm to the retardation R550 measured at a wavelength of 550 nm (R450/R550) is preferably from 0.75 to 1.1. So long as the ratio is within that range, ideal retardation characteristics can be obtained. For example, when a circular polarizer employing the transparent film as a ¼λ plate is to be produced, not only it is possible to provide a ¼λ plate which is ideal in the visible region but also the polarizing plate and a display device which have a small wavelength dependence and have neutral hues are rendered possible. From the standpoint of more stably obtaining this effect, the ratio (R450/R550) is more preferably 0.76-0.98, especially preferably 0.77-0.95.

It is preferred that the transparent film should have a photoelastic coefficient of $40\times10^{-12}$ Pa$^{-1}$ or less. In the case where the photoelastic coefficient thereof exceeds $40\times10^{-12}$ Pa$^{-1}$, the following problem may arise when this transparent film is laminated as a retardation film to a polarizing plate and this polarizing plate is mounted in a display device. Due to the stress which was caused during the laminating, partial stress is imposed on the retardation film by the action of the heat of the environment in which the display device is used or of the backlight. An uneven change in retardation hence occurs, resulting in a considerable decrease in image quality. Consequently, the photoelastic coefficient of the transparent film of the invention is preferably $40\times10^{-12}$ Pa$^{-1}$ or less, more preferably $35\times10^{-12}$ Pa$^{-1}$ or less.

The thickness of the transparent film is preferably 150 μm or less, more preferably 100 μm or less, even more preferably 60 μm or less. In the case where the thickness thereof exceeds 150 μm, it is necessary to use the material in a larger amount, resulting in difficulties in controlling homogeneity. Such a transparent film hence cannot be applied to appliances which are required to be precise, thin, and homogeneous.

It is preferred that the transparent film should have refractive indexes, as measured respectively in two in-plane directions, of nx and ny and have a thickness-direction refractive index of nz, and the refractive indexes nx, ny, and nz have a relationship which satisfies any one of expressions (7) to (9).

$$nx>ny=nz \quad (7)$$

$$nx>ny>nz \quad (8)$$

$$nx>nz>ny \quad (9)$$

When the refractive indexes thereof have the relationship nx>ny=nz, then uniaxial retardation films such as a λ plate, λ/2 plate, and λ/4 plate are obtained. Such films can be used in the viewing-angle compensators of liquid-crystal displays or for the color correction of reflected light in reflection-type or semi-transmissive displays, organic EL devices, and the like.

When the refractive indexes thereof have the relationship nx>ny>nz, this transparent film can be used as the viewing-angle compensator of a liquid-crystal display, especially as the viewing-angle compensator working in the VA (vertical alignment) mode, which is of the type in which one sheet is used for compensation or the type in which two sheets are used for compensation. Furthermore, this transparent film can be used also as a film for the color correction of reflected light like the film described above.

When the refractive indexes thereof have the relationship nx>nz>ny, this transparent film can be used as the viewing-angle compensation film of a polarizing plate or as the viewing-angle compensation film of a circularly polarizing plate, and is usable also as a film for the color correction of reflected light like the film described above. Furthermore, besides being used for such front-view applications, this transparent film can be used also for viewing-angle compensation.

It is preferred that the two in-plane refractive indexes nx and ny, thickness-direction refractive index nz, and thickness d of the transparent film should have a relationship which satisfies expressions (10) and (11).

$$NZ \text{ coefficient}=(nx-nz)/(nx-ny)=0.2 \text{ to } 8 \quad (10)$$

$$\Delta nd=(nx-ny)\cdot d=30 \text{ to } 400 \text{ nm} \quad (11)$$

By regulating the NZ coefficient so as to be within that range, this transparent film produces the effect of being capable of giving retardation films for viewing-angle compensation or color correction in various displays.

On the other hand, in the case where the NZ coefficient is less than 0.2, this necessitates an exceedingly special production process. This case hence may involve a drawback that the film has poor NZ coefficient accuracy and reduced productivity.

In the case where the NZ coefficient exceeds 8, this transparent film has an exceedingly large value of thickness-direction retardation, which is calculated using the equation Rth=(nx−nz)·d. It is hence necessary to increase the thickness of the material. Consequently, there is the possibility of resulting in an increase in material cost and a decrease in retardation reliability.

By regulating the $\Delta nd$ so as to be within that range, this transparent film can be used to easily produce λ/2 plates and λ/4 plates therefrom.

On the other hand, in the case where the Δnd is less than 30 nm, this transparent film falls under C-plates, which are so-called negatively uniaxial retardation films. A C-plate by itself cannot be used for the viewing-angle compensation of a display and use of another retardation film is necessary, resulting in an increase in the total number of retardation films. There hence is a possibility that a thickness reduction and a cost reduction might be difficult.

In the case where the Δnd exceeds 400 nm, it is necessary to increase the thickness in order to obtain a large value of retardation, and the increased thickness may be a cause of a decrease in productivity or reliability.

It is preferred that the transparent film should have a water absorption of 0.5-2.0% by weight. So long as the water absorption thereof is within that range, adhesiveness can be easily ensured when this transparent film is laminated to another film. For example, when the transparent film is to be laminated to a polarizing plate, it is easy to design an adhesive at will because this transparent film is hydrophilic and hence has a small contact angle with water. A high degree of adhesion design is hence possible. On the other hand, when the water absorption thereof is lower than the lower limit of that range, this film is hydrophobic and has a large contact angle with water, making it difficult to design adhesiveness. In addition, this film is apt to be electrostatically charged and this may pose a problem that when this film is incorporated into a polarizing plate or display device, the product has an increased number of appearance defects due to inclusion of foreign matter, etc. On the other hand, in the case where the water absorption thereof exceeds 2.0% by weight, the durability of optical properties in a high-humidity environment becomes poor. Such too high a water absorption hence is not so desirable. Consequently, the water absorption of the transparent film according to the invention is preferably 0.5-2.0% by weight, and is more preferably 0.6-1.4% by weight.

By laminating the transparent film to a polarizer, a polarizing plate can be configured.

As the polarizer, any of known polarizers having various configurations can be employed. For example, use can be made of a polarizer produced by adsorbing a dichroic substance, e.g., iodine or a dichroic dye, onto any of various films to dye the film and then crosslinking, stretching, and drying the film, by a conventionally known method.

Applications

In the case where the transparent film of the invention is used, for example, for the color compensation of an STN (super twisted nematic) liquid-crystal display device, this film has a value of retardation generally selected from the range of 400-2,000 nm. In the case where the polycarbonate resin film of the invention is used, for example, as a half-wavelength plate, this film may have a value of retardation selected from the range of 200-400 nm.

In the case where the transparent film of the invention is used, for example, as a quarter-wavelength plate, this film may have a value of retardation selected from the range of 90-200 nm. The value of retardation of the film for use as a quarter-wavelength plate more preferably is 100-180 nm.

For example, when the transparent film of the invention is to be used for the viewing-angle compensation of a liquid-crystal display which works in the VA mode, then a biaxial retardation plate having a value of retardation of 30-70 nm and an NZ coefficient in the range of 2-8 is selected. When the transparent film of the invention is used for the viewing-angle compensation of a liquid-crystal display which works in the IPS (in-place switching) mode, then a uniaxial retardation plate having a value of retardation of 100-160 nm and an NZ coefficient of 0.9-1.6 or a retardation plate having three-dimensionally regulated refractive indexes and having a value of retardation of 200-300 nm and an NZ coefficient of 0.3-0.8 is selected.

In the case where the transparent film of the invention (i.e., a stretched film formed by stretching the polycarbonate resin film) is used as any of those retardation plates, the transparent film can be used alone or two or more sheets of the transparent film can be used in combination. Furthermore, a combination of the transparent film with another film, etc. can be used.

As stated above, the transparent film of the invention can be laminated to a known iodine-containing or dye-containing polarizing plate (i.e., polarizer) through a pressure-sensitive adhesive. It is necessary that the transparent film should be laminated so that the polarization axis of the polarizing plate is kept at a specific angle with the slow axis of the transparent film according to applications.

The transparent film of the invention can be used, for example, as a quarter-wavelength plate and laminated to a polarizing plate to give a circular polarizer. In this case, the transparent film is generally laminated so that the polarization axis of the polarizing plate is kept at an angle of substantially 45° with the slow axis of the transparent film.

Furthermore, the transparent film of the invention may be used and laminated, for example, as a polarizer-protective film which is a component of a polarizing plate. Moreover, the transparent film of the invention can be used, for example, as the color compensation plate of an STN liquid-crystal display device and laminated to a polarizing plate to give an elliptical polarizer.

As described above, the transparent film of the invention can be used for retardation plates for various liquid-crystal display devices. For example, the retardation films are suitable for use in display devices including liquid-crystal and plasma displays and organic EL displays. These display devices can be produced by processes which themselves are known.

Examples of optical films to which the transparent film of the invention can be applied include member films or sheets which representatively are for liquid-crystal displays, such as retardation films, viewing-angle enlargement films, polarizer-protective films, prism sheets, diffusion sheets, reflection sheets, and films for preventing surface reflection, and release films, protective films, and the like for use in production steps.

<Polycarbonate Resin>

The polycarbonate resin according to the invention, which contains at least a constitutional unit derived from a dihydroxy compound having a bonded structure represented by the structural formula (1), is produced by reacting one or more dihydroxy compounds at least containing a dihydroxy compound having at least one bonded structure —$CH_2$—O— in the molecule with a carbonic diester in the presence of a polymerization catalyst.

As the dihydroxy compound having a bonded structure represented by the structural formula (1), a compound of any structure can be used so long as the compound has two alcoholic hydroxyl groups, contains a structure having the linking group —$CH_2$—O— in the molecule, and is capable of reacting with a carbonic diester in the presence of a polymerization catalyst to yield a polycarbonate. A plurality of such dihydroxy compounds may be used in combination. The dihydroxy compounds to be used for producing the polycarbonate resin according to the invention may further include a dihydroxy compound having no bonded structure represented by the structural formula (1). Hereinafter, the dihydroxy compound having a bonded structure represented by the structural formula (1) is often referred to simply as dihydroxy compound (A), and the dihydroxy compound having no bonded structure represented by the structural formula (1) is often referred to simply as dihydroxy compound (B).

Dihydroxy Compound (A)

The "linking group —$CH_2$—O—" in the dihydroxy compound (A) means a structure which is bonded to atoms other than hydrogen atoms to constitute a molecule. It is most preferred that the atom to which at least the oxygen atom in this linking group can be bonded or the atom to which both the carbon atom and the oxygen atom in the linking group can be simultaneously bonded should be a carbon atom. The number of "linking groups —$CH_2$—O—" in the dihydroxy compound (A) is 1 or larger, preferably 2-4.

More specific examples of the dihydroxy compound (A) include compounds which have an aromatic group as a side chain and have, in the main chain, ether groups each bonded to an aromatic group, such as 9,9-bis(4-(2-hydroxyethoxy)phenyl)fluorene, 9,9-bis(4-(2-hydroxyethoxy)-3-methylphenyl)fluorene, 9,9-bis(4-(2-hydroxyethoxy)-3-isopropylphenyl)fluorene, 9,9-bis(4-(2-hydroxyethoxy)-3-isobutylphenyl)fluorene, 9,9-bis(4-(2-hydroxyethoxy)-3-tert-butylphenyl)fluorene, 9,9-bis(4-(2-hydroxyethoxy)-3-cyclohexylphenyl)fluorene, 9,9-bis(4-(2-hydroxyethoxy)-3-phenylphenyl)fluorene, 9,9-bis(4-(2-hydroxyethoxy)-3,5-dimethylphenyl)fluorene, 9,9-bis(4-(2-hydroxyethoxy)-3-tert-butyl-6-methylphenyl)fluorene, and 9,9-bis(4-(3-hydroxy-2,2-dimethylpropoxy)phenyl)fluorene, bis(hydroxyalkoxyaryl)alkanes such as bis[4-(2-hydroxyethoxy)phenyl]methane, bis[4-(2-hydroxyethoxy)phenyl]diphenylmethane, 1,1-bis[4-(2-hydroxyethoxy)phenyl]ethane, 1,1-bis[4-(2-hydroxyethoxy)phenyl]-1-phenylethane, 2,2-bis[4-(2-hydroxyethoxy)phenyl]propane, 2,2-bis[4-(2-hydroxyethoxy)-3-methylphenyl]propane, 2,2-bis[3,5-dimethyl-4-(2-hydroxyethoxy)phenyl]propane, 1,1-bis[4-(2-hydroxyethoxy)phenyl]-3,3,5-trimethylcyclohexane, 1,1-bis[4-(2-hydroxyethoxy)phenyl]cyclohexane, 1,4-bis[4-(2-hydroxyethoxy)phenyl]cyclohexane, 1,3-bis[4-(2-hydroxyethoxy)phenyl]cyclohexane, 2,2-bis[4-(2-hydroxyethoxy)-3-phenylphenyl]propane, 2,2-bis[(2-hydroxyethoxy)-3-isopropylphenyl]propane, 2,2-bis[3-tert-butyl-4-(2-hydroxyethoxy)phenyl]propane, 2,2-bis[4-(2-hydroxyethoxy)phenyl]butane, 2,2-bis[4-(2-hydroxyethoxy)phenyl]-4-methylpentane, 2,2-bis[4-(2-hydroxyethoxy)phenyl]octane, 1,1-bis[4-(2-hydroxyethoxy)phenyl]decane, 2,2-bis[3-bromo-4-(2-hydroxyethoxy)phenyl]propane, and 2,2-bis[3-cyclohexyl-4-(2-hydroxyethoxy)phenyl]propane, bis(hydroxyalkoxyaryl)cycloalkanes such as 1,1-bis[4-(2-hydroxyethoxy)phenyl]cyclohexane, 1,1-bis[3-cyclohexyl-4-(2-hydroxyethoxy)phenyl]cyclohexane, and 1,1-bis[4-(2-hydroxyethoxy)phenyl]cyclopentane, dihydroxyalkoxydiaryl ethers such as 4,4'-bis(2-hydroxyethoxy)diphenyl ether and 4,4'-bis(2-hydroxyethoxy)-3,3'-dimethyldiphenyl ether, bishydroxyalkoxyaryl sulfides such as 4,4'-bis(2-hydroxyethoxyphenyl)sulfide and 4,4'-bis[4-(2-dihydroxyethoxy)-3-methylphenyl]sulfide, bishydroxyalkoxyaryl sulfoxides such as 4,4'-bis(2-hydroxyethoxyphenyl)sulfoxide and 4,4'-bis[4-(2-dihydroxyethoxy)-3-methylphenyl]sulfoxide, bishydroxyalkoxyaryl sulfones such as 4,4'-bis(2-hydroxyethoxyphenyl)sulfone and 4,4'-bis[4-(2-dihydroxyethoxy)-3-methylphenyl]sulfone, 1,4-bishydroxyethoxybenzene, 1,3-bishydroxyethoxybenzene, 1,2-bishydroxyethoxybenzene, 1,3-bis[2-[4-(2-hydroxyethoxy)phenyl]propyl]benzene, 1,4-bis[2-[4-(2-hydroxyethoxy)phenyl]propyl]benzene, 4,4'-bis(2-hydroxyethoxy)biphenyl, 1,3-bis[4-(2-hydroxyethoxy)phenyl]-5,7-dimethyladamantane, anhydrous sugar alcohols represented by dihydroxy compounds represented by the following structural formula (4), and compounds having a cyclic ether structure, such as the spiro glycol represented by the following structural formula (6). These dihydroxy compounds may be used alone or in combination of two or more thereof

[Chem. 5]

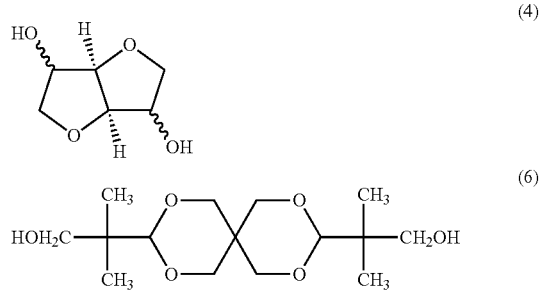

Those dihydroxy compounds (A) may be used alone or in combination of two or more thereof.

Examples of the dihydroxy compounds represented by the structural formula (4), in the invention, include isosorbide, isomannide, and isoidide, which are stereoisomers. One of these may be used alone, or two or more thereof may be used in combination.

The proportions in which a dihydroxy compound represented by the structural formula (4) and another dihydroxy compound are used are the same as described above as the proportions of constitutional units which are derived from the dihydroxy compounds and constitute the polycarbonate resin according to the invention.

Preferred of those dihydroxy compounds (A) is isosorbide from the standpoints of ease of procurement and production thereof, optical properties, and moldability. Isosorbide is obtained by the dehydrating condensation of sorbitol, which is produced from various starches which are abundant resources and are easily available.

Isosorbide is apt to be gradually oxidized by oxygen. It is therefore important that when isosorbide is stored or handled during production, a free-oxygen scavenger or a nitrogen atmosphere should be used in order to prevent decomposition caused by oxygen. It is also important to prevent water inclusion.

Upon oxidation, isosorbide generates decomposition products including formic acid. For example, in the case where isosorbide containing these decomposition products is used for polycarbonate production, the decomposition products are causative of coloration of the resultant polycarbonate or considerably deteriorated properties thereof. In addition, there are the cases where the decomposition products affect the polymerization reaction to make it impossible to obtain a polymer having a high molecular weight.

In the case where a stabilizer for preventing the generation of formic acid has been added, the polycarbonate obtained has taken a color or has considerably deteriorated properties, depending on the kind of the stabilizer. As the stabilizer, use is made of a reducing agent or an antacid. Examples of the reducing agent among these include sodium borohydride and lithium borohydride, and examples of the antacid include sodium hydroxide. However, addition of such an alkali metal salt in too large an amount may render the polymerization reaction uncontrollable, because the alkali metal functions also as a polymerization catalyst.

Isosorbide may be distilled according to need in order to obtain isosorbide which contains no oxidative-decomposition products. Also in the case where a stabilizer has been incorporated in order to prevent the isosorbide from being oxidized or decomposed, the isosorbide may be distilled according to need in order to remove the stabilizer. In this case, the distillation of the isosorbide may be simple distillation or continuous distillation, and is not particularly limited. After the atmosphere is replaced with an inert gas atmosphere, such as argon or nitrogen, the distillation is conducted at a reduced pressure.

By subjecting, for example, isosorbide to such distillation, the isosorbide can be made to have a formic acid content of less than 20 ppm, preferably 10 ppm or less, more preferably 5 ppm or less, even more preferably 3 ppm or less. Especially preferably, high-purity isosorbide containing no formic acid at all can be obtained. Simultaneously therewith, the content of alkali and/or alkaline earth metal compounds in the isosorbide, in terms of metal amount per mole of the isosorbide, can be reduced to 10 μmol or less, preferably 5 μmol or less, more preferably 3 μmol or less, even more preferably 1 μmol or less. Especially preferably, high-purity isosorbide containing no alkali and/or alkaline earth metal compounds at all can be obtained.

It is preferred in the invention to use a dihydroxy compound (A), e.g., a dihydroxy compound represented by the structural formula (4), that has a formic acid content less than 20 ppm. The formic acid content thereof is preferably 10 ppm or less, more preferably 5 ppm or less, even more preferably 3 ppm or less. Especially preferably, the dihydroxy compound (A) contains entirely no formic acid generated by, for example, decomposition of the dihydroxy compound (A). By using a dihydroxy compound (A), e.g., a dihydroxy compound represented by the structural formula (4), that has such a high purity as a starting material, problems which may be encountered in the polymerization reaction that will be described later are overcome. As a result, a high-quality polycarbonate further reduced in coloration, etc. can be stably and efficiently produced.

Specific means for reacting a dihydroxy compound (A), e.g., a dihydroxy compound represented by the structural formula (4), in which the contents of formic acid and of alkali and/or alkaline earth metal compounds are low as described above with a carbonic diester are not particularly limited. However, the following method can, for example, be employed.

The high-purity dihydroxy compound (A), e.g., dihydroxy compound represented by the structural formula (4), is stored in an oxygen-free atmosphere, preferably an inert gas atmosphere or a reduced-pressure or vacuum atmosphere, until the compound is reacted with a carbonic diester. It is preferred that the dihydroxy compound which has been taken out of the storage atmosphere should be subjected to a reaction system for reaction with a carbonic diester usually within 2 weeks, more preferably within 1 week, when stored in an environment of 40° C. and 80% RH. So long as the dihydroxy compound represented by the structural formula (4) is stored in an environment of 40° C. and 80% RH, polymerization thereof is not inhibited even when the dihydroxy compound is allowed to stand in the air for usually 2 weeks or shorter, preferably 1 week or shorter. In the case where the temperature and the humidity are lower than 40° C. and 80% RH, respectively, the storage period can be further prolonged.

Examples of the inert gas atmosphere include atmospheres of one or more inert gases, such as nitrogen and argon, which have an oxygen content of 1,000 ppm or less, in particular, contain no oxygen at all. Examples of the reduced-pressure atmosphere include atmospheres which have a pressure of 13.3 kPa or less and an oxygen content of 100 ppm or less. A deoxidizing agent including an iron powder as a main component, e.g., a deoxidizing agent such as Ageless (registered trademark) (manufactured by Mitsubishi Gas Chemical Co., Ltd.) or Oxy-Eater (manufactured by Ueno Fine Chemicals Industry, Ltd.), and a drying agent, such as silica gel, a molecular sieve, or aluminum oxide, may be caused to coexist in the storage system according to need.

Furthermore, since the dihydroxy compound (A), e.g., isosorbide, generates decomposition products including formic acid upon oxidation, it is effective to store the dihydroxy compound at a low temperature in order to prevent the generation.

So long as the storage temperature is 40° C. or lower, the dihydroxy compound (A) can be kept usable for the polymerization for 1 month, when a deoxidizing agent is caused to coexist and the compound is stored in an inert gas atmosphere having an oxygen concentration kept at 1,000 ppm or less. The storage temperature is 40° C. or lower, preferably 25° C. or lower, more preferably 10° C. or lower, even more preferably 5° C. or lower.

Powdery or flaky isosorbide can be stored at a humidity as high as 80% RH. However, since the isosorbide undergoes a change in weight due to moisture absorption, it is preferred to store the isosorbide in the state of being sealed with a moisture proof aluminum bag or the like or to store the isosorbide in an inert gas atmosphere, in order to avoid moisture absorption.

A suitable combination of these conditions may be used.

When the dihydroxy compound (A), e.g., a dihydroxy compound represented by the structural formula (4), is subjected to reaction with the carbonic diester which will be described later, the state or form thereof is not particularly limited. The dihydroxy compound (A) may be powdery or flaky, or may be in a liquid state such as a molten state or an aqueous solution.

Dihydroxy Compound (B)

In the invention, the dihydroxy compound (B), which is a dihydroxy compound other than the dihydroxy compound (A), may be used as a dihydroxy compound. For example, an alicyclic dihydroxy compound, an aliphatic dihydroxy compound, an oxyalkylene glycol, an aromatic dihydroxy compound, a diol having a cyclic ether structure, or the like can be used as the dihydroxy compound (B), i.e., as a dihydroxy compound which gives constitutional units of the polycarbonate, together with the dihydroxy compound (A), e.g., a dihydroxy compound represented by the structural formula (4).

The alicyclic dihydroxy compound usable in the invention is not particularly limited. However, it is usually preferred to use a compound which contains a 5-membered cyclic structure or a 6-membered cyclic structure. The 6-membered cyclic structure may have a chair form or boat form which has been fixed by means of covalent bonding. By using such an alicyclic dihydroxy compound having a 5-membered or 6-membered cyclic structure, a polycarbonate having enhanced heat resistance can be obtained. The number of the carbon atoms contained in the alicyclic dihydroxy compound is generally 70 or less, preferably 50 or less, more preferably 30 or less. The larger the number thereof, the higher the heat resistance. However, as the number of the carbon atoms increases, the alicyclic dihydroxy compound becomes more difficult to synthesize and purify and becomes more expensive. The smaller the number of the carbon atoms, the easier the purification and procurement of the alicyclic dihydroxy compound.

Examples of the alicyclic dihydroxy compound which contains a 5-membered cyclic structure or 6-membered cyclic structure and which can be used in the invention include alicyclic dihydroxy compounds represented by the following general formula (II) or (III).

$$HOCH_2—R^1—CH_2OH \qquad (II)$$

$$HO—R^2—OH \qquad (III)$$

(In the general formulae (II) and (III), $R^1$ and $R^2$ each represent a cycloalkylene group having 4-20 carbon atoms.)

Cyclohexanedimethanol, which is an alicyclic dihydroxy compound represented by the general formula (II), includes various isomers represented by the general formula (II) in which $R^1$ is represented by the following general formula (IIa) (wherein $R^3$ represents an alkyl group having 1-12 carbon atoms or a hydrogen atom). Specific examples thereof include 1,2-cyclohexanedimethanol, 1,3-cyclohexanedimethanol, and 1,4-cyclohexanedimethanol.

[Chem. 6]

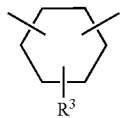

(IIa)

Tricyclodecanedimethanol and pentacyclodecanedimethanol, which are alicyclic dihydroxy compounds represented by the general formula (II), include various isomers represented by the general formula (II) in which $R^1$ is represented by the following general formula (IIb) (wherein n represents 0 or 1).

[Chem. 7]

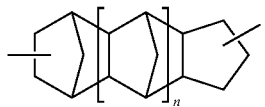

(IIb)

Decalindimethanol or tricyclotetradecanedimethanol, which each is an alicyclic dihydroxy compound represented by the general formula (II), includes various isomers represented by the general formula (II) in which $R^1$ is represented by the following general formula (IIc) (wherein m represents 0 or 1). Specific examples thereof include 2,6-decalindimethanol, 1,5-decalindimethanol, and 2,3-decalindimethanol.

[Chem. 8]

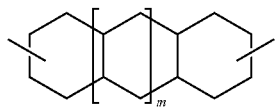

(IIc)

Norbornanedimethanol, which is an alicyclic dihydroxy compound represented by the general formula (II), includes various isomers represented by the general formula (II) in which $R^1$ is represented by the following general formula (IId). Specific examples thereof include 2,3-norbornanedimethanol and 2,5-norbornanedimethanol.

[Chem. 9]

(IId)

Adamantanedimethanol, which is an alicyclic dihydroxy compound represented by the general formula (II), includes various isomers represented by the general formula (II) in which $R^1$ is represented by the following general formula (IIe). Specific examples thereof include 1,3-adamantanedimethanol.

[Chem. 10]

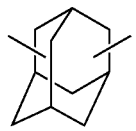

(IIe)

Cyclohexanediol, which is an alicyclic dihydroxy compound represented by the general formula (III), includes various isomers represented by the general formula (III) in which $R^2$ is represented by the following general formula (IIIa) (wherein $R^3$ represents an alkyl group having 1-12 carbon atoms or a hydrogen atom). Specific examples thereof include 1,2-cyclohexanediol, 1,3-cyclohexanediol, 1,4-cyclohexanediol, and 2-methyl-1,4-cyclohexanediol.

[Chem. 11]

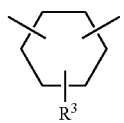

(IIIa)

Tricyclodecanediol and pentacyclopentadecanediol, which are alicyclic dihydroxy compounds represented by the general formula (III), include various isomers represented by the general formula (III) in which $R^2$ is represented by the following general formula (IIIb) (wherein n represents 0 or 1).

[Chem. 12]

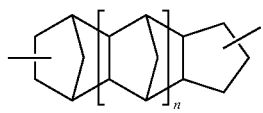

(IIIb)

Decalindiol or tricyclotetradecanediol, which each is an alicyclic dihydroxy compound represented by the general formula (III), includes various isomers represented by the general formula (III) in which $R^2$ is represented by the following general formula (IIIc) (wherein m represents 0 or 1). Specifically, 2,6-decalindiol, 1,5-decalindiol, 2,3-decalindiol, or the like may be used as the alicyclic dihydroxy compound.

[Chem. 13]

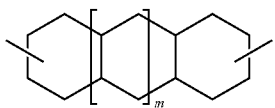

(IIIc)

Norbornanediol, which is an alicyclic dihydroxy compound represented by the general formula (III), includes various isomers represented by the general formula (III) in which $R^2$ is represented by the following general formula (IIId). Specifically, 2,3-norbornanediol, 2,5-norbornanediol, or the like may be used as the alicyclic dihydroxy compound.

[Chem. 14]

(IIId)

Adamantanediol, which is an alicyclic dihydroxy compound represented by the general formula (III), includes various isomers represented by the general formula (III) in which $R^2$ is represented by the following general formula (IIIe). Specifically, 1,3-adamantanediol or the like may be used as the alicyclic dihydroxy compound.

[Chem. 15]

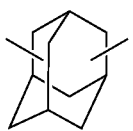

(IIIe)

Especially preferred of the examples of alicyclic dihydroxy compounds described above are cyclohexanedimethanols, tricyclodecanedimethanols, adamantanediols, and pentacyclopentadecanedimethanols. Preferred from the standpoints of availability and handleability are 1,4-cyclohexanedimethanol, 1,3-cyclohexanedimethanol, 1,2-cyclohexanedimethanol, and tricyclodecanedimethanol.

Examples of the aliphatic dihydroxy compound usable in the invention include ethylene glycol, 1,3-propanediol, 1,2-propanediol, 1,4-butanediol, 1,3-butanediol, 1,2-butanediol, 1,5-heptanediol, and 1,6-hexanediol.

Examples of the oxyalkylene glycol usable in the invention include diethylene glycol, triethylene glycol, tetraethylene glycol, and polyethylene glycol.

Examples of the aromatic dihydroxy compound usable in the invention include 2,2-bis(4-hydroxyphenyl)propane [=bisphenol A], 2,2-bis(4-hydroxy-3,5-dimethylphenyl)propane, 2,2-bis(4-hydroxy-3,5-diethylphenyl)propane, 2,2-bis(4-hydroxy-(3,5-diphenyl)phenyl)propane, 2,2-bis(4-hydroxy-3,5-dibromophenyl)propane, 2,2-bis(4-hydroxyphenyl)pentane, 2,4'-dihydroxydiphenylmethane, bis(4-hydroxyphenyl)methane, bis(4-hydroxy-5-nitrophenyl)methane, 1,1-bis(4-hydroxyphenyl)ethane, 3,3-bis(4-hydroxyphenyl)pentane, 1,1-bis(4-hydroxyphenyl)cyclohexane, bis(4-hydroxyphenyl)sulfone, 2,4'-dihydroxydiphenyl sulfone, bis(4-hydroxyphenyl)sulfide, 4,4'-dihydroxydiphenyl ether, 4,4'-dihydroxy-3,3'-dichlorodiphenyl ether, 4,4'-dihydroxy-2,5-diethoxydiphenyl ether, 9,9-bis[4-(2-hydroxyethoxy)phenyl]fluorene, 9,9-bis[4-(2-hydroxyethoxy-2-methyl)phenyl]fluorene, 9,9-bis(4-hydroxyphenyl)fluorene, and 9,9-bis(4-hydroxy-2-methylphenyl)fluorene.

Examples of the diol having a cyclic ether structure which is usable in the invention include spiro glycols and dioxane glycols.

Incidentally, the specific compounds shown above are mere examples of the alicyclic dihydroxy compound, aliphatic dihydroxy compound, oxyalkylene glycol, aromatic dihydroxy compound, and diol having a cyclic ether structure which are usable in the invention, and these compounds should not be construed as being limited to those examples in any way. One or more of these compounds can be used together with a dihydroxy compound represented by the structural formula (4).

Use of these dihydroxy compounds (B) can produce effects such as improvements in flexibility, heat resistance, and moldability according to applications. The proportion of the dihydroxy compound (A), e.g., a dihydroxy compound represented by the structural formula (4), to all dihydroxy compounds which constitute the polycarbonate resin according to the invention is not particularly limited. However, the proportion thereof is preferably 10% by mole or higher, more preferably 40% by mole or higher, even more preferably 60% by mole or higher, and is preferably 90% by mole or less, more preferably 80% by mole or less, even more preferably 70% by mole or less. In the case where the content of constitutional units derived from other dihydroxy compounds is too high, there are the cases where these constitutional units reduce performances such as optical properties.

When an alicyclic dihydroxy compound is used among those other dihydroxy compounds, then the total proportion of the dihydroxy compound (A), e.g., a dihydroxy compound represented by the structural formula (4), and the alicyclic dihydroxy compound to all dihydroxy compounds which constitute the polycarbonate is not particularly limited. However, the total proportion thereof is preferably 80% by mole or higher, more preferably 90% by mole or higher, especially preferably 95% by mole or higher.

With respect to the proportion of constitutional units derived from the dihydroxy compound (A), e.g., a dihydroxy compound represented by the structural formula (4), to constitutional units derived from the alicyclic dihydroxy compound, in the polycarbonate resin according to the invention, any desired proportion can be selected. However, the value of [constitutional units derived from the dihydroxy compound represented by the structural formula (4)]:[constitutional units derived from the alicyclic dihydroxy compound] is preferably from 1:99 to 99:1 (% by mole). It is especially preferred that the value of [constitutional units derived from the dihydroxy compound represented by the structural formula (4)]:[constitutional units derived from the alicyclic dihydroxy compound] should be from 10:90 to 90:10 (% by mole). In the case where the content of the constitutional units derived from the dihydroxy compound represented by the structural formula (4) is higher than that range and the content of the constitutional units derived from the alicyclic dihydroxy compound is less than that range, the polycarbonate is apt to take a color. Conversely, in the case where the content of the constitutional units derived from the dihydroxy compound represented by the structural formula (4) is too low and the content of the constitutional units derived from the alicyclic dihydroxy compound is too high, the polycarbonate tends to have an insufficient molecular weight.

Furthermore, when the aliphatic dihydroxy compound, oxyalkylene glycol, aromatic dihydroxy compound, and diol having a cyclic ether structure are used, then the total proportion of the dihydroxy compound (A), e.g., a dihydroxy compound represented by the structural formula (4), and each of these dihydroxy compounds to all dihydroxy compounds which constitute the polycarbonate is not particularly limited and any desired proportion can be selected. In addition, the proportion of constitutional units derived from the dihydroxy compound (A), e.g., a dihydroxy compound represented by the structural formula (4), to constitutional units derived from each of those dihydroxy compounds also is not particularly limited, and any desired proportion can be selected.

It is preferred that the polycarbonate resin according to the invention which has constitutional units derived from the dihydroxy compounds (hereinafter this resin is often referred to as "polycarbonate copolymer") should have a degree of polymerization which is preferably 0.40 dL/g or higher, more preferably 0.43 dL/g or higher, and is generally 2.00 dL/g or less, preferably 1.60 dL/g or less, in terms of reduced viscosity determined by using a 1:1 by weight mixed solution of phenol and 1,1,2,2-tetrachloroethane as a solvent to precisely regulate the polycarbonate concentration to 1.00 g/dL and measuring the viscosity of the solution at a temperature of 30.0±0.1° C. (hereinafter referred to simply as "reduced viscosity of polycarbonate"). In the case where the polycarbonate has an exceedingly low reduced viscosity, this polycarbonate has insufficient mechanical strength after molding. In the case where the polycarbonate has too high a reduced viscosity, this polycarbonate shows reduced flowability during molding, resulting in reduced cycle characteristics and a prolonged molding cycle time. In addition, this polycarbonate tends to give molded articles having enhanced birefringence.

The polycarbonate resin according to the invention has an Abbe number of preferably 20 or larger, more preferably 50 or larger, especially preferably 55 or larger. The larger the value thereof, the smaller the wavelength-dependent dispersion of refractive indexes and the smaller the aberration. This polycarbonate resin gives films suitable for optical use. The smaller the Abbe number, the larger the wavelength-dependent dispersion of refractive indexes and the larger the chromatic aberration. Consequently, the larger the Abbe number, the more the polycarbonate resin is preferred. There is no particular upper limit on the value thereof.

The polycarbonate resin according to the invention has a 5% weight loss temperature of preferably 340° C. or higher, more preferably 345° C. or higher. The higher the 5% weight loss temperature, the higher the thermal stability and the higher the temperature at which the polycarbonate resin can be used. In addition, higher production temperatures are usable and a wider control width during production is possible, thereby facilitating the production. The lower the 5% weight loss temperature, the lower the thermal stability. There are the cases where this polycarbonate resin is difficult to use at high temperatures. In addition, there are the cases where the allowable control width during production is narrowed, rendering the production difficult. Consequently, there is no particular upper limit on the 5% weight loss temperature. The higher the 5% weight loss temperature, the better the polycarbonate resin. The decomposition temperature of the copolymer may be an upper limit.

The photoelastic coefficient of the polycarbonate resin according to the invention is preferably $-20\times10^{-12}$ $Pa^{-1}$ or higher, more preferably $-10\times10^{-12}$ $Pa^{-1}$ or higher, and is preferably $40\times10^{-12}$ $Pa^{-1}$ or lower, more preferably $30\times10^{-12}$ $Pa^{-1}$ or lower. When an optical film, for example, is produced, there are the cases where the polycarbonate resin having a large value of photoelastic coefficient gives, through melt extrusion, solution casting, etc., a film which has a large value of retardation and which, upon stretching, comes to have further increased unevenness of in-plane retardation due to slight fluctuations in tension. Furthermore, when such a retardation film is laminated, not only the tension applied during the laminating results in a shifting from a desired retardation but also there are the cases where the resultant polarizing plate is apt to suffer a change in retardation due to the shrinkage of the polarizing plate after the laminating. The lower the photoelastic coefficient, the more the unevenness in retardation can be reduced.

The polycarbonate resin according to the invention has an Izod impact strength of preferably 30 $J/m^2$ or higher. The higher the Izod impact strength, the higher the strength of the molded object and the less the molded object breaks. Consequently, there is no particular upper limit thereon.

It is preferred that the amount of gases, other than phenol ingredients, which generate per unit area from the polycarbonate resin according to the invention at 110° C. (hereinafter often referred to simply as "gas generation amount") should be 5 $ng/cm^2$ or less. It is more preferred that the amount of generated gases derived from the dihydroxy compounds other than the dihydroxy compound represented by the structural formula (4) should be 0.5 $ng/cm^2$ or less. The smaller the gas generation amount, the more the polycarbonate resin is suitable for use in applications where influences of generated gases should be avoided, such as, for example, applications for storing electronic parts, e.g., semiconductors, interior materials for buildings, and the housings of, for example, domestic electrical appliances.

Specific methods for determining the photoelastic coefficient and glass transition temperature of the polycarbonate resin according to the invention are as will be shown later in the section Examples.

The polycarbonate resin according to the invention gives a single glass transition temperature when examined by differential scanning calorimetry (DSC). This glass transition temperature can be regulated by changing the kinds of the dihydroxy compound represented by the structural formula (4) and alicyclic dihydroxy compound and regulating the mixing ratio therebetween. Thus, the resin can be obtained as a polymer having any desired glass transition temperature in the range of, for example, from about 45° C. to about 155° C. according to applications.

For film applications, flexibility is usually required. It is therefore preferred to regulate the polycarbonate resin so as to have a glass transition temperature of 45° C. or higher, for example, 45-130° C.

It is preferred that the polycarbonate resin according to the invention should simultaneously have at least two of those properties. It is more preferred that the polycarbonate resin should further have other properties.

The polycarbonate resin according to the invention can be produced by a melt polymerization method in which one or more dihydroxy compounds including the dihydroxy compound (A) are reacted with a carbonic diester in the presence of a polymerization catalyst.

Carbonic Diester

Examples of the carbonic diester to be used in the process for producing the polycarbonate of the invention include diphenyl carbonate, substituted diphenyl carbonates represented by ditolyl carbonate, dimethyl carbonate, diethyl carbonate, and di-t-butyl carbonate. Especially preferred examples thereof include diphenyl carbonate and substituted diphenyl carbonates. One of these carbonic diesters may be used alone, or a mixture of two or more thereof may be used.

The carbonic diester is used in such an amount that the molar ratio thereof to all dihydroxy compounds to be subjected to the reaction is preferably 0.90-1.10, more preferably 0.96-1.04. When the molar ratio thereof is less than 0.90, there are the cases where the polycarbonate thus produced has an increased amount of terminal OH groups, resulting in impaired thermal stability of the polymer, or where a product having a desired high molecular weight is not obtained. In the case where the molar ratio thereof exceeds 1.10, not only the transesterification reaction proceeds at a reduced rate when conducted under the same conditions or it is difficult to produce a polycarbonate having a desired molecular weight, but also there are the cases where the polycarbonate copolymer thus produced has an increased content of the residual carbonic diester and this residual carbonic diester is causative of an odor during molding or in the molded articles.

Polymerization Catalyst

It is preferred to use an alkali and/or alkaline earth metal compound as the polymerization catalyst for use in producing the polycarbonate resin according to the invention.

In the case where an alkali metal compound and/or an alkaline earth metal compound is used as the polymerization catalyst, the amount of this polymerization catalyst to be used, in terms of metal amount per mole of all dihydroxy compounds to be subjected to the reaction, is in the range of generally 0.1-25 µmol, preferably 0.5-20 µmol, more preferably 0.5-15 µmol. The upper limit thereof is even more preferably 10 µmol or less, especially preferably 5 µmol or less. By regulating the amount of the catalyst so as to be within that range, the polymerization reaction can be reliably controlled and a high-quality polycarbonate can be produced stably and efficiently. When the polymerization catalyst is used in too small an amount, there are the cases where polymerization activity necessary for producing a polycarbonate having a desired molecular weight is not obtained. On the other hand, when the polymerization catalyst is used in too large an amount, there are the cases where a polycarbonate having an impaired hue is obtained and by-products generate to cause a decrease in flowability and enhanced generation of gel particles, making it difficult to produce a polycarbonate having desired quality.

It is possible to use a basic compound such as a basic boron compound, basic phosphorus compound, basic ammonium compound, or amine compound as an auxiliary together with an alkali metal compound and/or an alkaline earth metal compound. However, it is especially preferred to use an alkali metal compound and/or an alkaline earth metal compound only.

Examples of the alkali metal compound to be used as a polymerization catalyst include sodium hydroxide, potassium hydroxide, lithium hydroxide, cesium hydroxide, sodium hydrogen carbonate, potassium hydrogen carbonate, lithium hydrogen carbonate, cesium hydrogen carbonate, sodium carbonate, potassium carbonate, lithium carbonate, cesium carbonate, sodium acetate, potassium acetate, lithium acetate, cesium acetate, sodium stearate, potassium stearate, lithium stearate, cesium stearate, sodium boron hydride, potassium boron hydride, lithium boron hydride, cesium boron hydride, phenylated boron-sodium compounds, phenylated boron-potassium compounds, phenylated boron-lithium compounds, phenylated boron-cesium compounds, sodium benzoate, potassium benzoate, lithium benzoate, cesium benzoate, disodium hydrogen phosphate, dipotassium hydrogen phosphate, dilithium hydrogen phosphate, dicesium hydrogen phosphate, disodium phenyl phosphate, dipotassium phenyl phosphate, dilithium phenyl phosphate, dicesium phenyl phosphate, alcoholates or phenolates of sodium, potassium, lithium, and cesium, and the disodium salt, dipotassium salt, dilithium salt, and dicesium salt of bisphenol A.

Examples of the alkaline earth metal compound include calcium hydroxide, barium hydroxide, magnesium hydroxide, strontium hydroxide, calcium hydrogen carbonate, barium hydrogen carbonate, magnesium hydrogen carbonate, strontium hydrogen carbonate, calcium carbonate, barium carbonate, magnesium carbonate, strontium carbonate, calcium acetate, barium acetate, magnesium acetate, strontium acetate, calcium stearate, barium stearate, magnesium stearate, and strontium stearate. In this description, the terms "alkali metal" and "alkaline earth metal" are used as terms having the same meanings as "Group-1 element" and "Group-2 element", respectively, within the long-form periodic table (Nomenclature of Inorganic Chemistry IUPAC Recommendations 2005).

One of these alkali metal compounds and/or alkaline earth metal compounds may be used alone, or two or more thereof may be used in combination.

Examples of the basic boron compound which may be used in combination with the alkali metal compound and/or alkaline earth metal compound include the sodium salts, potassium salts, lithium salts, calcium salts, barium salts, magnesium salts, or strontium salts of tetramethylboron, tetraethylboron, tetrapropylboron, tetrabutylboron, trimethylethylboron, trimethylbenzylboron, trimethylphenylboron, triethylmethylboron, triethylbenzylboron, triethylphenylboron, tributylbenzylboron, tributylphenylboron, tetraphenylboron, benzyltriphenylboron, methyltriphenylboron, and butyltriphenylboron.

Examples of the basic phosphorus compound include triethylphosphine, tri-n-propylphosphine, triisopropylphosphine, tri-n-butylphosphine, triphenylphosphine, tributylphosphine, and quaternary phosphonium salts.

Examples of the basic ammonium compound include tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide, and butyltriphenylammonium hydroxide.

Examples of the amine compound include 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole, and aminoquinoline. One of these basic compounds also may be used alone, or two or more thereof may be used in combination.

<Process for Producing the Polycarbonate Resin>

In the invention, the dihydroxy compound (A), e.g., a dihydroxy compound represented by the structural formula (4), may be fed as a solid, or may be heated and fed in a molten state, or may be fed as an aqueous solution.

On the other hand, the dihydroxy compound (B), e.g., an alicyclic dihydroxy compound, and other dihydroxy compounds also may be fed as a solid, or may be heated and fed in a molten state, or may be fed as an aqueous solution when soluble in water.

The feeding of these starting-material dihydroxy compounds in a molten state or as an aqueous solution has an advantage that it is easy to meter and transport the dihydroxy compounds when the polycarbonate resin is produced industrially.

For reacting the dihydroxy compound (A), e.g., a dihydroxy compound represented by the structural formula (4), and an alicyclic dihydroxy compound with a carbonic diester in the presence of a polymerization catalyst optionally together with other dihydroxy compounds in the invention, use may be made of a method in which the reaction is carried out in one step. Usually, however, the reaction is conducted in multiple steps including two or more stages. Specifically, the reaction in the first stage is conducted at a temperature of 140-220° C., preferably 150-200° C., for 0.1-10 hours, preferably 0.5-3 hours. In the second and any succeeding stages, the reaction temperature is raised while gradually lowering the pressure of the reaction system from the pressure used in the first stage. The polycondensation reaction is thus conducted while the phenol which generates simultaneously is being removed from the reaction system. Finally, the polycondensation reaction is conducted at a pressure of the reaction system of 200 Pa or below and at a temperature in the range of 210-280° C.

With respect to pressure reduction in this polycondensation reaction, it is important to control a balance between the temperature and the internal pressure of the reaction system. Especially when either the temperature or the pressure is changed too early, there are the cases where an unreacted monomer is distilled off to change the molar ratio of the dihydroxy compounds to the carbonic diester, resulting in a decrease in polymerization degree. For example, when isosorbide and 1,4-cyclohexanedimethanol are used as dihydroxy compounds and when the molar proportion of the 1,4-cyclohexanedimethanol to all dihydroxy compounds is 50% by mole or more, then some of the 1,4-cyclohexanedimethanol is apt to be distilled off in the monomer state. In this case, use may be made of a method in which the reaction mixture is reacted at a reduced internal pressure of the reaction system of about 13 kPa while elevating the temperature at a heating rate of 40° C./hr or less and further reacted at a pressure down to about 6.67 kPa while elevating the temperature at a heating rate of 40° C./hr or less, and the polycondensation reaction is finally conducted at a pressure of 200 Pa or less and a temperature of 200-250° C. This method is preferred because a polycarbonate having a sufficiently increased degree of polymerization is obtained.

On the other hand, when the molar proportion of, for example, 1,4-cyclohexanedimethanol to all dihydroxy compounds is less than 50% by mole, in particular, 30% by mole or less, an abrupt increase in viscosity occurs as compared with the case in which the proportion of 1,4-cyclohexanedimethanol is 50% by mole or more. Consequently, use may be made, for example, of a method in which the reaction mixture is reacted, while elevating the temperature at a heating rate of 40° C./hr or less until the internal pressure of the reaction system is reduced to about 13 kPa, and further reacted at a pressure down to about 6.67 kPa while elevating the temperature at a heating rate of 40° C./hr or higher, preferably at a heating rate of 50° C./hr or higher, and the polycondensation reaction is finally conducted at a reduced pressure of 200 Pa or less and a temperature of 220-290° C. This method is preferred because a polycarbonate having a sufficiently increased degree of polymerization is obtained.

The mode of reaction operation may be any of the batch type, the continuous type, and a combination of the batch type and the continuous type.

When a polycarbonate is produced by the melt polymerization method in the process of the invention, it is possible to add phosphoric acid compounds, phosphorous acid compounds, or metal salts of either during the polymerization for the purpose of preventing coloring.

Suitable as the phosphoric acid compounds are one or more of trialkyl phosphates such as trimethyl phosphate and triethyl phosphate. The amount of such phosphoric acid compounds to be added is preferably 0.0001-0.005% by mole, more preferably 0.0003-0.003% by mole, based on all dihydroxy compounds to be reacted. When phosphorus compounds are added in an amount smaller than the lower limit, there are the cases where the effect of preventing coloring is low. When the amount thereof is larger than the upper limit, there are the cases where the phosphorus compounds are causative of an increase in haze or enhance, rather than diminish, coloring, or where the phosphorus compounds reduce the heat resistance.

In the case of adding phosphorous acid compounds, any of the following heat stabilizers can be selected at will. In particular, use of one or more of trimethyl phosphite, triethyl phosphite, trisnonylphenyl phosphite, trimethyl phosphite, tris(2,4-di-tert-butylphenyl) phosphite, and bis(2,4-di-tert-butylphenyl)pentaerythritol diphosphite is suitable. The amount of these phosphorous acid compounds to be added is preferably 0.0001-0.005% by mole, more preferably 0.0003-0.003% by mole, based on all dihydroxy compounds to be reacted. When phosphorous acid compounds are added in an amount smaller than the lower limit, there are the cases where the effect of preventing coloring is low. When the amount thereof is larger than the upper limit, there are the cases where the phosphorous acid compounds are causative of an increase in haze or enhance, rather than diminish, coloring, or where the phosphorous acid compounds reduce the heat resistance.

It is possible to add a phosphoric acid compound and a phosphorous acid compound in combination or to add metal salts thereof in combination. In this case, the total addition amount of the phosphoric acid compound and the phosphorous acid compound or the total addition amount of the metal salts thereof is preferably 0.0001-0.005% by mole, more preferably 0.0003-0.003% by mole, based on all the dihydroxy compounds shown above. When the addition amount thereof is smaller than the lower limit, there are the cases where the effect of preventing coloring is low. When the addition amount thereof is larger than the upper limit, there are the cases where the compounds or salts are causative of an increase in haze or enhance, rather than diminish, coloring, or where the compounds or salts reduce the heat resistance.

The metal salts of phosphoric acid compounds and of phosphorous acid compounds preferably are alkali metal salts thereof and the zinc salts thereof. Especially preferred are the zinc salts. Preferred of the phosphoric acid zinc salts are the zinc salts of (long-chain-alkyl)phosphoric acids.

A heat stabilizer can be incorporated into the polycarbonate thus produced, in order to prevent the resin from decreasing in molecular weight or deteriorating in hue during molding, etc.

Examples of the heat stabilizer include phosphorous acid, phosphoric acid, phosphonous acid, phosphonic acid, and esters thereof. Specific examples thereof include triphenyl phosphite, tris(nonylphenyl)phosphite, tris(2,4-di-tert-butylphenyl)phosphite, tridecyl phosphite, trioctyl phosphite, trioctadecyl phosphite, didecyl monophenyl phosphite, dioctyl monophenyl phosphite, diisopropyl monophenyl phosphite, monobutyl diphenyl phosphite, monodecyl diphenyl phosphite, monooctyl diphenyl phosphite, bis(2,6-di-tert-butyl-4-methylphenyl)pentaerythritol diphosphite, 2,2-methylenebis(4,6-di-tert-butylphenyl)octyl phosphite, bis(nonylphenyl)pentaerythritol diphosphite, bis(2,4-di-tert-butylphenyl)pentaerythritol diphosphite, distearyl pentaerythritol diphosphite, tributyl phosphate, triethyl phosphate, trimethyl phosphate, triphenyl phosphate, diphenyl mono-o-xenyl phosphate, dibutyl phosphate, dioctyl phosphate, diisopropyl phosphate, tetrakis(2,4-di-tert-butylphenyl) 4,4'-biphenylenediphosphinate, dimethyl benzenephosphonate, diethyl benzenephosphonate, and dipropyl benzenephosphonate. Preferred of these are trisnonylphenyl phosphite, trimethyl phosphate, tris(2,4-di-tert-butylphenyl) phosphite, bis(2,4-di-tert-butylphenyl)pentaerythritol diphosphite, bis(2,6-di-tert-butyl-4-methylphenyl)pentaerythritol diphosphite, and dimethyl benzenephosphonate.

One of these heat stabilizers may be used alone, or two or more thereof may be used in combination.

Such a heat stabilizer can be additionally incorporated in addition to the amount of the heat stabilizer which was added during the melt polymerization. Namely, after a polycarbonate has been obtained using an adequate amount of a phosphorous acid compound or phosphoric acid compound incorporated into the system, a phosphorous acid compound may be further incorporated by the incorporation method which will be described later. Thus, the heat stabilizer can be incorporated in a larger amount while avoiding an increase in haze, coloring, and a decrease in heat resistance during the polymerization, making it possible to prevent hue deterioration.

The amount of those heat stabilizers to be incorporated per 100 parts by weight of the polycarbonate is preferably 0.0001-1 part by weight, more preferably 0.0005-0.5 parts by weight, even more preferably 0.001-0.2 parts by weight.

<Additives>

A generally known antioxidant can be incorporated into the polycarbonate resin according to the invention for the purpose of preventing oxidation.

Examples of the antioxidant include one or more of pentaerythritol tetrakis(3-mercaptopropionate), pentaerythritol tetrakis(3-laurylthiopropionate), glycerol 3-stearylthiopropionate, triethylene glycol bis[3-(3-tert-butyl-5-methyl-4-hydroxyphenyl)propionate], 1,6-hexanediol bis[3-(3,5-di-tert-butyl-4-hydroxyphenyl)propionate], pentaerythritol tetrakis[3-(3,5-di-tert-butyl-4-hydroxyphenyl)propionate], octadecyl 3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylenebis(3,5-di-tert-butyl-4-hydroxyhydrocinnamamide), diethyl 3,5-di-tert-butyl-4-hydroxybenzylphosphonate, tris(3,5-di-tert-butyl-4-hydroxybenzyl)isocyanurate, tetrakis(2,4-di-tert-butylphenyl) 4,4'-biphenylenediphosphinate, 3,9-bis{1,1-dimethyl-2-[β-(3-tert-butyl-4-hydroxy-5-methylphenyl)propionyloxy]ethyl}-2,4,8,10-tetraoxaspiro(5,5)undecane, and the like.

One of these antioxidants may be used alone, or two or more thereof may be used in combination.

The amount of these antioxidants to be incorporated is preferably 0.0001-0.5 parts by weight per 100 parts by weight of the polycarbonate.

A light stabilizer can be incorporated into the polycarbonate resin according to the invention so long as the incorporation thereof does not defeat the objects of the invention.

Examples of the light stabilizer include 2-(2'-hydroxy-5'-tert-octylphenyl)benzotriazole, 2-(3-tert-butyl-5-methyl-2-hydroxyphenyl)-5-chlorobenzotriazole, 2-(5-methyl-2-hydroxyphenyl)benzotriazole, 2-[2-hydroxy-3,5-bis(α,α-dimethylbenzyl)phenyl]-2H-benzotriazole, 2,2'-methylenebis(4-cumyl-6-benzotriazolephenyl), and 2,2'-p-phenylenebis(1,3-benzoxazin-4-one).

One of these light stabilizers may be used alone, or two or more thereof may be used in combination.

The amount of the light stabilizer to be incorporated is preferably 0.01-2 parts by weight per 100 parts by weight of the polycarbonate.

Furthermore, a bluing agent can be incorporated into the polycarbonate resin according to the invention in order to lessen or eliminate the yellowish tint attributable to the polymer and the ultraviolet absorber. Any bluing agent for use in polycarbonate resins may be used without raising particular difficulties. In general, anthraquinone dyes are easily available and preferred.

Representative examples of the bluing agent include common name Solvent Violet 13 [CA. No. (Color Index No.) 60725], common name Solvent Violet 31 [CA. No. 68210], common name Solvent Violet 33 [CA. No. 60725], common name Solvent Blue 94 [CA. No. 61500], common name Solvent Violet 36 [CA. No. 68210], common name Solvent Blue 97 ["Macrolex Violet RR", manufactured by Bayer AG], and common name Solvent Blue 45 [CA. No. 61110].

One of these bluing agents may be used alone, or two or more thereof may be used in combination.

These bluing agents are incorporated usually in an amount of $0.1 \times 10^{-4}$ to $2 \times 10^{-4}$ parts by weight per 100 parts by weight of the polycarbonate.

For mixing the polycarbonate resin according to the invention with various additives such as those described above, use may be made, for example, of a method in which the resin and the additives are mixed together by means of a tumbling mixer, twin-cylinder mixer, supermixer, Nauta Mixer (registered trademark), Banbury mixer, kneading rolls, kneader, or the like or a solution blending method in which the ingredients are mixed together in the state of having been dissolved in a common good solvent, e.g., methylene chloride. Mixing methods are not particularly limited to these methods, and any polymer blending method in common use may be employed.

The polycarbonate thus obtained or the polycarbonate composition obtained by incorporating various additives and other resin(s) into the polycarbonate can be molded, as such or after temporarily formed into pellets with a melting extruder, into a film or sheet form by a generally known technique, e.g., extrusion molding. Thus, optical parts such as optical film, e.g., retardation films, diffusion sheets, and polarizing films, for use in liquid-crystal display devices, plasma displays, and the like can be produced.

It is preferred to use a single-screw extruder or a twin-screw extruder for the melting and extrusion from the standpoint of highly mixing the polycarbonate to obtain stable properties. The technique in which a single-screw extruder or a twin-screw extruder is used does not necessitate use of a solvent or the like and imposes little burden on the environment. This technique is suitable also from the standpoint of productivity.

The melt kneading temperature of the extruder depends on the glass transition temperature of the polycarbonate. In the case where the polycarbonate has a glass transition temperature lower than 90° C., the melt kneading temperature of the extruder is generally 130-250° C., preferably 150-240° C. When the melt kneading temperature is lower than 130° C., there are the cases where the polycarbonate has a high melt viscosity to impose an increased load on the extruder, resulting in a decrease in productivity. When the melt kneading temperature is higher than 250° C., there are the cases where the polycarbonate has a reduced melt viscosity to make it difficult to obtain pellets, resulting in a decrease in productivity.

In the case where the polycarbonate has a glass transition temperature of 90° C. or higher, the melt kneading temperature of the extruder is generally 200-300° C., preferably 220-260° C. When the melt kneading temperature is lower than 200° C., there are the cases where the polycarbonate has a high melt viscosity to impose an increased load on the extruder, resulting in a decrease in productivity. When the melt kneading temperature is higher than 300° C., the polycarbonate is apt to deteriorate and there are the cases where the polycarbonate yellows or suffers a deterioration in strength due to a decrease in molecular weight.

In the case where an extruder is used, it is desirable to dispose a filter in order to prevent scorching of the polycarbonate and inclusion of foreign matter during the extrusion. The rejection size (i.e., opening size) of the filter depends on the desired optical precision. However, the opening size thereof is preferably 100 μm or less. Especially in the case where inclusion of foreign matter should be avoided, the opening size of the filter is preferably 40 μm or less, in particular, 20 μm or less. In the case where inclusion of foreign matter should be more strictly avoided, the opening size of the filter is preferably 10 μm or less.

From the standpoint of preventing inclusion of foreign matter from occurring after extrusion, it is desirable that the extrusion of the polycarbonate should be conducted in a clean room.

Furthermore, for cooling and pelletizing the extruded polycarbonate, it is preferred to use a cooling method such as air cooling or water cooling. It is desirable that air from which airborne foreign matter has been removed beforehand with a high-efficiency particulate air filter or the like should be used for the air cooling to prevent airborne foreign matter from adhering again. In the case of conducting water cooling, it is desirable to use water from which metallic substances have been removed with an ion-exchange resin or the like and from which foreign matter has been removed with a filter. Although filters having various opening sizes may be used, a filter having an opening size of 10-0.45 μm is preferred.

In the case where an optical material or an optical part is to be molded from the polycarbonate, it is desirable that not only the step of introducing starting materials but also the polymerization step and the step of extruding the resultant copolymer in a cooling medium into a pellet or sheet form should be conducted while taking care not to permit dust particles or the like to come into the system. The cleanness of the clean room may usually be class 1,000 or cleaner in the case where the polycarbonate is for compact disks, and may be class 100 or cleaner in the case where the polycarbonate is for use in information recording applications for which higher cleanness is required.

EXAMPLES

The invention will be explained below in more detail by reference to Production Examples and Experimental Examples. In the following Examples, properties of polycarbonate resins were evaluated by the following methods.
(Standard Stretching Temperature)

A film obtained through melt extrusion with the extruder which will be described later was cut into a size having a width of 5 mm and a length of 25 mm, and a dynamic viscoelastometer (Rheogel-E4000, manufactured by UBM) was used to determine the storage modulus E' thereof over the temperature range of 40-200° C. under the conditions of a frequency of 100 Hz and a heating rate of 3° C./min. A standard stretching temperature was determined from the graph which was a plot of the storage modulus E' against temperature, by taking the temperature which corresponded to the intersection of a tangent to the curve as the standard stretching temperature.
(Glass Transition Temperature)

Using a differential scanning calorimeter ("DSC 220", manufactured by SII Nano Technology Inc.), about 10 mg of a polycarbonate resin was examined while heating the resin at a heating rate of 10° C./min. In accordance with JIS-K7121 (1987), the lower-temperature-side base line was extended toward the higher-temperature side to draw a straight line, and a tangent that touched the stepwise changing part, which was due to a glass transition, at the point where the curve had a maximum slope was drawn. The extrapolated glass transition initiation temperature, which was the temperature corresponding to the intersection of the straight line and the tangent, was determined and taken as the glass transition temperature.
(Refractive Index)

Refractive index was measured with an Abbe refractometer ("DR-M4", manufactured by Atago Co., Ltd.) using an interference filter for a wavelength of 589 nm (d-line).

A polycarbonate resin as a test sample was press-molded at 160-200° C. to produce a film having a thickness of 80-500 μm. The film obtained was cut into a strip shape having a width of about 8 mm and a length of 10-40 mm to obtain a test piece.

The measurement was made at 20° C. using 1-bromonaphthalene as an interface liquid.
(Storage Modulus)

The dynamic viscoelastometer was used to determine 40° C. storage modulus E' in the same manner as the method for measuring glass transition temperature.
(Tensile Test)

A polycarbonate resin was formed into a film having a thickness of 100 μm using a film production apparatus equipped with a single-screw extruder (manufactured by Isuzu Kakoki; screw diameter, 25 mm; set cylinder temperature, 220° C.), a T-die (width, 200 mm; set temperature, 220° C.), a chill roll (set temperature, 120-130° C.), and a winder. A strip having a width of 20 mm and a length of 150 mm was cut out of the film using a safety razor. A tensile tester equipped with a thermostatic chamber (Tensilon, manufactured by A&D Co., Ltd.) was used, and the temperature of the thermostatic chamber was set at the glass transition temperature. The test piece was examined for stress-strain curve.

The stress was determined by dividing the load obtained with the tensile tester by the initial cross-sectional area of the test piece. The strain was determined by dividing the distance over which a chuck of the tensile tester had moved by the initial chuck-to-chuck distance. The initial chuck-to-chuck distance was set at 50 mm, and the chuck speed (pulling speed) was set at 500 mm/min.

The parameters used are as follows.

(1) Upper Yield Stress in Tension: The initial stress which is observed when the strain increases without being accompanied by an increase in stress, after initiation of the tensile test.

(2) Lower Yield Stress in Tension: The stress which is observed in the course of the tensile test when the stress has dropped abruptly after an upper yield point and the strain increases with substantially no increase in stress.

In the case where a clear yield phenomenon is not observed, the intersection of tangents to the stress-strain curve is determined as an upper yield stress in tension. In this case, the ratio of the lower yield stress in tension to the upper yield stress in tension in expression (2) is taken as 1.

(3) Breaking Stress in Tension: The tensile stress measured when the test piece breaks.

(Photoelastic Coefficient)

<Sample Production>

A 4.0 g portion of a polycarbonate resin sample which had been vacuum-dried at 80° C. for 5 hours was pressed for 1 minute with a hot press using a spacer having a width of 8 cm, length of 8 cm, and thickness of 0.5 mm, under the conditions of a hot-pressing temperature of 200-250° C., a preheating period of 1-3 minutes, and a pressure of 20 MPa. Thereafter, the sample was taken out together with the spacer and then pressed and cooled with a water tube cooling type press at a pressure of 20 MPa for 3 minutes to produce a sheet. A sample having a width of 5 mm and a length of 20 mm was cut out of the sheet.

<Measurement>

A measurement was made using an apparatus including a combination of a birefringence analyzer constituted of a He—Ne laser, a polarizer, a compensator, an analyzer, and a photodetector and an oscillatory type viscoelastometer ("DVE-3", manufactured by Rheology Co., Ltd.). (For details, refer to *Journal of the Society of Rheology Japan*, Vol. 19, pp. 93-97 (1991).)

The sample cut out was fixed to the viscoelastometer and examined for storage modulus E' at a frequency of 96 Hz at room temperature of 25° C. Simultaneously therewith, the laser light emitted was passed through the polarizer, the sample, the compensator, and the analyzer in this order, picked up with the photodetector (photodiode), and passed through a lock-in amplifier, and the waveform at an angular frequency of ω or 2ω was examined for retardation with respect to the amplitude and strain. A strain-optical coefficient O' was determined therefrom. In this apparatus, the polarizer and the analyzer were regulated so that the directions thereof were perpendicular to each other and each formed an angle of π/4 with the direction of extension of the sample.

The photoelastic coefficient was determined from the storage modulus E' and the strain-optical coefficient O' using the following equation.

$$\text{Photoelastic coefficient} = O'/E'$$

(Birefringence *1 of Transparent Film)

<Sample Production>

A polycarbonate resin which had been vacuum-dried at 80° C. for 5 hours was formed into a film having a thickness of 100 µm using a film production apparatus equipped with a single-screw extruder (manufactured by Isuzu Kakoki; screw diameter, 25 mm; set cylinder temperature, 220° C.), a T-die (width, 200 mm; set temperature, 220° C.), a chill roll (set temperature, 120-130° C.), and a winder. A sample having a width of 6 cm and a length of 6 cm was cut out of the film. This sample was subjected to uniaxial stretching using a batch-type biaxially stretching apparatus (manufactured by Toyo Seiki Seisaku-Sho, Ltd.) at a stretching temperature of (standard stretching temperature for the polycarbonate resin)+5° C. and a stretching speed of 720 mm/min (strain rate, 1,200%/min) in a stretch ratio of 1×2.0 to obtain a transparent film. In this operation, the sample was stretched while being held (stretch ratio, 1.0) along the direction perpendicular to the stretch direction.

<Measurement>

Using a retardation analyzer ("KOBRA-WPR", manufactured by Oji Scientific Instruments), a sample having a width of 4 cm and a length of 4 cm cut out of the transparent film was examined for phase retardation at a measuring wavelength of 590 nm (R590). This phase retardation (R590) was divided by the thickness (t) of the sample to determine the birefringence *1 in accordance with the following equation.

$$\text{Birefringence} * 1 = R590/t$$

<Distillation of Isosorbide>

The isosorbide to be used for the polycarbonate resin production in Production Examples 1 to 4 was distilled in the following manner.

The isosorbide was introduced into a distillation vessel, and the pressure began to be gradually reduced. Subsequently, the contents were heated and melted at an internal temperature of about 100° C. Thereafter, a distillate began to be obtained at an internal temperature of 160° C. The pressure at this point of time was 133-266 Pa. After the initial distillate was taken out, distillation was carried out at an interval temperature of 160-170° C., a column top temperature of 150-157° C., and 133 Pa. After completion of the distillation, argon was introduced to return the pressure to ordinary pressure. The distillation product obtained was cooled and pulverized in an argon stream to obtain isosorbide purified by distillation. In a nitrogen stream, this purified isosorbide was put in an aluminum-laminated bag together with Ageless (registered trademark) (manufactured by Mitsubishi Gas Chemical Co., Ltd.), and this bag was sealed and stored at room temperature.

Production Example 1

Polycarbonate Resin A

Into a reaction vessel were introduced 89.44 parts by weight of isosorbide (hereinafter often abbreviated to "ISB"), 37.83 parts by weight of 1,4-cyclohexanedimethanol (hereinafter often abbreviated to "CHDM"), 191.02 parts by weight of diphenyl carbonate (hereinafter often abbreviated to "DPC"), and 1.068 parts by weight of 0.2% by weight aqueous cesium carbonate solution as a catalyst. In a nitrogen atmosphere, the temperature of the heating bath was elevated to 150° C. to dissolve the starting materials while stirring the mixture according to need (about 15 minutes) in preparation for a first reaction step.

Subsequently, the pressure was reduced from ordinary pressure to 13.3 kPa, and the temperature of the heating bath was elevated to 190° C. over 1 hour, during which the phenol that generated was discharged from the reaction vessel.

The whole reaction vessel was held at 190° C. for 15 minutes. Thereafter, a second step was conducted in which at an internal pressure of the reaction vessel of 6.67 kPa, the temperature of the heating bath was elevated to 230° C. over 15 minutes and the phenol that generated was discharged from the reaction vessel. The stirring torque of the stirrer increased gradually and, hence, the temperature was elevated to 250° C. over 8 minutes. Furthermore, the internal pressure of the reaction vessel was reduced to 0.200 kPa or below in order to remove the phenol that generated. After a given stirring torque had been reached, the reaction was terminated. The reaction product yielded was extruded in water to obtain pellets of a polycarbonate copolymer.

The polycarbonate resin obtained had a reduced viscosity of 1.007 dL/g. The standard stretching temperature, refractive index, birefringence *1, photoelastic coefficient, storage modulus E', upper yield stress in tension, lower yield stress in tension, and breaking stress in tension of the polycarbonate resin and relationships with numerical ranges specified in the invention are shown in Table 1.

Production Example 2

Polycarbonate Resin B

A polycarbonate was produced in the same manner as in Production Example 1, except that the starting materials were replaced with 81.98 parts by weight of isosorbide, 47.19 parts by weight of tricyclodecanedimethanol (hereinafter often abbreviated to "TCDDM"), 175.1 parts by weight of DPC, and 0.979 parts by weight of 0.2% by weight aqueous cesium carbonate solution as a catalyst. Thus, a polycarbonate resin B was obtained. The various properties of the polycarbonate resin B obtained were determined in the same manners as for the polycarbonate resin A, and are shown in Table 1.

Production Example 3

Polycarbonate Resin C

A polycarbonate was produced in the same manner as in Production Example 1, except that the starting materials were replaced with 86.61 parts by weight of isosorbide, 16.66 parts by weight of TCDDM, 24.47 parts by weight of CHDM, 185.42 parts by weight of DPC, and 1.037 parts by weight of 0.2% by weight aqueous cesium carbonate solution as a catalyst. Thus, a polycarbonate resin C was obtained. The various properties of the polycarbonate resin C obtained were determined in the same manners as for the polycarbonate resin A, and are shown in Table 1.

Production Example 4

Polycarbonate Resin D

A polycarbonate was produced in the same manner as in Production Example 1, except that the starting materials were replaced with 36.02 parts by weight of isosorbide, 71.8 parts by weight of 9,9-[4-(2-hydroxyethoxy)phenyl]fluorene (hereinafter often abbreviated to "BHEPE"), 24.47 parts by weight of CHDM, 129.46 parts by weight of DPC, and 1.037 parts by weight of 0.2% by weight aqueous cesium carbonate solution as a catalyst. Thus, a polycarbonate resin D was obtained. The various properties of the polycarbonate resin D obtained were determined in the same manners as for the polycarbonate resin A, and are shown in Table 1.

Production Example 5

Polycarbonate Resin E

A polycarbonate was produced in the same manner as in Production Example 1, except that the starting materials were replaced with 41.8 parts by weight of isosorbide, 87.9 parts by weight of BHEPF, 6.2 parts by weight of diethylene glycol, 118.4 parts by weight of DPC, and 0.887 parts by weight of 0.2% by weight aqueous cesium carbonate solution as a catalyst. Thus, a polycarbonate resin E was obtained. The various properties of the polycarbonate resin E obtained were determined in the same manners as for the polycarbonate resin A, and are shown in Table 1.

Production Example 6

Polycarbonate Resin F

A polycarbonate was produced in the same manner as in Production Example 1, except that the starting materials were replaced with 37.5 parts by weight of isosorbide, 91.7 parts by weight of BHEPF, 8.2 parts by weight of polyethylene glycol having a molecular weight of 400 (hereinafter often abbreviated to "PEG#400"), 105.7 parts by weight of DPC, and 0.792 parts by weight of 0.2% by weight aqueous cesium carbonate solution as a catalyst. Thus, a polycarbonate resin F was obtained. The various properties of the polycarbonate resin F obtained were determined in the same manners as for the polycarbonate resin A, and are shown in Table 1.

Production Example 7

Polycarbonate Resin G

A polycarbonate was produced in the same manner as in Production Example 1, except that the starting materials were replaced with 44.6 parts by weight of isosorbide, 85.8 parts by weight of BHEPF, 6.2 parts by weight of PEG#400, 112.3 parts by weight of DPC, and 0.841 parts by weight of 0.2% by weight aqueous cesium carbonate solution as a catalyst. Thus, a polycarbonate resin G was obtained. The various properties of the polycarbonate resin G obtained were determined in the same manners as for the polycarbonate resin A, and are shown in Table 1.

Production Example 8

Polycarbonate Resin H

A polycarbonate was produced in the same manner as in Production Example 1, except that the starting materials were replaced with 31.9 parts by weight of isosorbide, 71.8 parts by weight of BHEPF, 32.1 parts by weight of TCDDM, 119.2 parts by weight of DPC, and 0.667 parts by weight of 0.2% by weight aqueous cesium carbonate solution as a catalyst. Thus, a polycarbonate resin H was obtained. The various properties of the polycarbonate resin H obtained were determined in the same manners as for the polycarbonate resin A, and are shown in Table 1.

Experimental Example 1

The polycarbonate resin A obtained in Production Example 1 was formed into a film having a thickness of 100 μm using a film production apparatus equipped with a single-screw extruder (manufactured by Isuzu Kakoki; screw diameter, 25 mm; set cylinder temperature, 220° C.), a T-die (width, 200 mm; set temperature, 220° C.), a chill roll (set temperature, 120-130° C.), and a winder. A test piece of a square shape having dimensions of 60 mm×60 mm was cut out of the resultant film by means of a safety razor, and subjected to uniaxial stretching using a batch-type biaxially stretching apparatus (manufactured by Toyo Seiki Seisaku-Sho, Ltd.) at a stretching temperature of 134° C. and a stretching speed of 240 mm/min (i.e., strain rate of 400%/min) in a stretch ratio of 1×2.2. The stretched film obtained was examined for thickness with respect to eleven points in total, i.e., the center and five points located on each side thereof along the stretching direction at an interval of 10 mm. An average thickness and thickness unevenness (i.e., the difference between the maximum and the minimum of the eleven values) were determined. The results obtained are shown in Table 2.

As can be seen from Table 1 and Table 2, the stretched film (transparent film) obtained in Experimental Example 1 has excellent properties including reduced thickness unevenness, because the polycarbonate resin film used as a raw material satisfied expressions (2) and (3) and the stretching conditions satisfied expression (5).

Experimental Example 2

A stretched film was produced and examined for thickness in the same manners as in Experimental Example 1, except that the stretching was conducted at a stretching speed of 600 mm/min (strain rate, 1,000%/min). The results obtained are shown in Table 2.

As can be seen from Table 1 and Table 2, the stretched film (transparent film) obtained in Experimental Example 2 has excellent properties including reduced thickness unevenness, because the polycarbonate resin film used as a raw material satisfied expressions (2) and (3) and the stretching conditions satisfied expression (5).

Experimental Example 3

A stretched film was produced and examined for thickness in the same manners as in Experimental Example 1, except that the polycarbonate resin B produced in Production Example 2 was used in place of the polycarbonate resin A used in Experimental Example 1 and that the stretching temperature was changed to 138° C. The results obtained are shown in Table 2.

As can be seen from Table 1 and Table 2, the stretched film (transparent film) obtained in Experimental Example 3 has excellent properties including reduced thickness unevenness, because the stretching conditions satisfied expression (5) although the polycarbonate resin film used as a raw material did not satisfy expressions (2) and (3).

Experimental Example 4

A stretched film was produced and examined for thickness in the same manners as in Experimental Example 1, except that the polycarbonate resin C produced in Production Example 3 was used in place of the polycarbonate resin A used in Experimental Example 1 and that the stretching temperature was changed to 133° C. The results obtained are shown in Table 2.

As can be seen from Table 1 and Table 2, the stretched film (transparent film) obtained in Experimental Example 4 has excellent properties including reduced thickness unevenness, because the polycarbonate resin film used as a raw material satisfied expressions (2) and (3) and the stretching conditions satisfied expression (5).

Experimental Example 5

A stretched film was produced and examined for thickness in the same manners as in Experimental Example 4, except that the stretching was conducted at a stretching speed of 600 mm/min (strain rate, 1,000%/min). The results obtained are shown in Table 2.

As can be seen from Table 1 and Table 2, the stretched film (transparent film) obtained in Experimental Example 5 has excellent properties including reduced thickness unevenness, because the polycarbonate resin film used as a raw material satisfied expressions (2) and (3) and the stretching conditions satisfied expression (5).

Experimental Example 6

A stretched film was produced and examined for thickness in the same manners as in Experimental Example 1, except that the polycarbonate resin D produced in Production Example 4 was used in place of the polycarbonate resin A used in Experimental Example 1 and that the stretching temperature and the stretching speed were changed to 142° C. and 600 mm/min, respectively. The results obtained are shown in Table 2.

As can be seen from Table 1 and Table 2, the stretched film (transparent film) obtained in Experimental Example 6 has excellent properties including reduced thickness unevenness, because the polycarbonate resin film used as a raw material satisfied expressions (2) and (3) and the stretching conditions satisfied expression (5).

Experimental Example 7

A stretched film was produced and examined for thickness in the same manners as in Experimental Example 1, except that the stretching was conducted at a stretching speed of 1,200 mm/min (strain rate, 2,000%/min). The results obtained are shown in Table 2.

As can be seen from Table 1 and Table 2, the stretched film (transparent film) obtained in Experimental Example 7 has relatively high thickness unevenness, because the stretching conditions did not satisfy expression (5) although the polycarbonate resin film used as a raw material satisfied expressions (2) and (3).

Experimental Example 8

A stretched film was produced and examined for thickness in the same manners as in Experimental Example 1, except that the polycarbonate resin E produced in Production Example 5 was used in place of the polycarbonate resin A used in Experimental Example 1 and that the stretching temperature and the stretching speed were changed to 135° C. and 240 mm/min (strain rate, 400%/min), respectively. The results obtained are shown in Table 2.

As can be seen from Table 1 and Table 2, the stretched film (transparent film) obtained in Experimental Example 8 has excellent properties including reduced thickness unevenness, because the polycarbonate resin film used as a raw material satisfied expressions (2) and (3) and the stretching conditions satisfied expression (5).

Experimental Example 9

A stretched film was produced and examined for thickness in the same manners as in Experimental Example 1, except that the polycarbonate resin F produced in Production Example 6 was used in place of the polycarbonate resin A used in Experimental Example 1 and that the stretching temperature and the stretching speed were changed to 139° C. and 600 mm/min (strain rate, 1,000%/min), respectively. The results obtained are shown in Table 2.

As can be seen from Table 1 and Table 2, the stretched film (transparent film) obtained in Experimental Example 9 has excellent properties including reduced thickness unevenness, because the polycarbonate resin film used as a raw material satisfied expressions (2) and (3) and the stretching conditions satisfied expression (5).

Experimental Example 10

A stretched film was produced and examined for thickness in the same manners as in Experimental Example 9, except that the stretching speed was changed to 240 mm/min (strain rate, 400%/min) The results obtained are shown in Table 2.

As can be seen from Table 1 and Table 2, the stretched film (transparent film) obtained in Experimental Example 10 has excellent properties including reduced thickness unevenness, because the polycarbonate resin film used as a raw material satisfied expressions (2) and (3) and the stretching conditions satisfied expression (5).

Experimental Example 11

A stretched film was produced and examined for thickness in the same manners as in Experimental Example 1, except that the polycarbonate resin G produced in Production Example 7 was used in place of the polycarbonate resin A used in Experimental Example 1 and that the stretching temperature and the stretching speed were changed to 143° C. and 240 mm/min (strain rate, 400%/min), respectively. The results obtained are shown in Table 2.

As can be seen from Table 1 and Table 2, the stretched film (transparent film) obtained in Experimental Example 11 has excellent properties including reduced thickness unevenness, because the polycarbonate resin film used as a raw material satisfied expressions (2) and (3) and the stretching conditions satisfied expression (5).

Experimental Example 12

A stretched film was produced and examined for thickness in the same manners as in Experimental Example 3, except that the stretching was conducted at a stretching speed of 60 mm/min (strain rate, 100%/min). The results obtained are shown in Table 2.

As can be seen from Table 1 and Table 2, the stretched film (transparent film) obtained in Experimental Example 12 had highest thickness unevenness among the Experiments given above, because the polycarbonate resin film used as a raw material did not satisfy expressions (2) and (3) and the stretching conditions did not satisfy expression (5).

In the following Experimental Examples 13 to 16, the stretched films (transparent films) obtained were examined also for other properties. The other properties were determined in the following manners.

Film Thickness: A measurement was made using contact type thickness gauge "PEACOCK" (product name), manufactured by Ozaki MFG. Co., Ltd.

Transmittance: The value of Y measured with a spectrophotometer (product name "DOT-3", manufactured by Murakami Color Research Laboratory Co., Ltd.) at 23° C. and a wavelength of 550 nm as reference conditions was used.

Water Absorption: A stretched film having a thickness of 130±50 μm was examined in accordance with the "Test Method for Determining Water Absorption and Boiling-water Absorption of Plastics" as provided for in JIS K 7209.

Birefringence and Retardation Characteristics of Retardation Film: The retardation characteristics of a retardation film were determined by measuring the three-dimensional-direction refractive indexes, retardation, and birefringence *2 thereof (590 nm, 23° C.) using a Mueller matrix polarimeter (AXO Scan, manufactured by AXOMETRICS Inc.).

Refractive Index: A measurement was made at 20° C. using Abbe refractometer "DR-M4", manufactured by Atago Co., Ltd.

Photoelastic Coefficient: A measurement was made using "Ellipso", manufactured by JASCO Corp.

Experimental Example 13

A stretched film was produced in the same manner as in Experimental Example 1, except that the polycarbonate resin H produced in Production Example 8 was used in place of the polycarbonate resin A used in Experimental Example 1 and that the stretching was replaced with free-end stretching conducted in a stretch ratio of 2 at a stretching temperature of 137° C. The properties thereof were measured. The results obtained are shown in Table 3. This retardation film was laminated to a polarizing plate, and this laminate was mounted on a display device. As a result, exceedingly high display quality was obtained.

Experimental Example 14

A stretched film was produced in the same manner as in Experimental Example 1, except that the polycarbonate resin F produced in Production Example 6 was used in place of the polycarbonate resin A used in Experimental Example 1 and that the stretching was replaced with free-end stretching conducted in a stretch ratio of 2 at a stretching temperature of 131° C. The properties thereof were measured. The results obtained are shown in Table 3. This retardation film was laminated to a polarizing plate, and this laminate was mounted on a display device. As a result, exceedingly high display quality was obtained.

Experimental Example 15

A stretched film was produced in the same manner as in Experimental Example 1, except that the polycarbonate resin G produced in Production Example 7 was used in place of the polycarbonate resin A used in Experimental Example 1 and that the stretching was replaced with free-end stretching conducted in a stretch ratio of 2 at a stretching temperature of 135° C. The properties thereof were measured. The results obtained are shown in Table 3. This retardation film was laminated to a polarizing plate, and this laminate was mounted on a display device. As a result, exceedingly high display quality was obtained.

Experimental Example 16

A stretched film was produced from the polycarbonate resin A in the same manner as in Experimental Example 1, except that the stretching was replaced with free-end stretching conducted in a stretch ratio of 2 at a stretching temperature of 125° C. The properties thereof were measured. The results thereof are shown in Table 3. This retardation film was laminated to a polarizing plate, and this laminate was mounted on a display device. As a result, coloration was observed and the display device had considerably reduced display quality.

Experimental Example 17

The polycarbonate resin G produced in Production Example 7 was used in place of the polycarbonate resin A used in Experimental Example 1, and this resin was extruded in the same manner as in Example 1 to obtain a film having a thickness of 130 μm. A stretched film was produced in the same manner as in Experimental Example 1, except that the film was laminated to a shrinkable film (i.e., biaxially stretched PP film) with a pressure-sensitive adhesive and that at a stretching temperature of 135° C., the laminate was shrunk by 20% and subjected to fixed-end uniaxial stretching in a stretch ratio of 1.2, in place of the stretching conducted in Experimental Example 1. The properties thereof were measured. The results obtained are shown in Table 3. This retardation film was laminated to a polarizing plate, and this laminate was mounted on a display device. As a result, exceedingly high display quality was obtained.

Experimental Example 18

The polycarbonate resin G produced in Production Example 7 was used in place of the polycarbonate resin A used in Experimental Example 1, and this resin was extruded in the same manner as in Example 1 to obtain a film having a thickness of 170 μm. A stretched film was produced in the same manner as in Experimental Example 1, except that the film was subjected to free-end longitudinal stretching at 131° C. in a stretch ratio of 1.5 and then to fixed-end uniaxial stretching at 136° C. in a stretch ratio of 1.6, in place of the stretching conducted in Experimental Example 1. The properties thereof were measured. The results obtained are shown in Table 3. This retardation film was laminated to a polarizing plate, and this laminate was mounted on a display device. As a result, exceedingly high display quality was obtained.

TABLE 1

| | Unit | Production Example 1 Polycarbonate resin A | Production Example 2 Polycarbonate resin B | Production Example 3 Polycarbonate resin C | Production Example 4 Polycarbonate resin D | Production Example 5 Polycarbonate resin E | Production Example 6 Polycarbonate resin F | Production Example 7 Polycarbonate resin G | Production Example 8 Polycarbonate resin H |
|---|---|---|---|---|---|---|---|---|---|
| [Feed composition] | | | | | | | | | |
| ISB | mol % | 70 | 70 | 70 | 41.4 | 52.5 | 52.8 | 59.1 | 40 |
| CHDM | mol % | 30 | — | 20 | 31.1 | — | — | — | — |
| TCDDM | mol % | — | 30 | 10 | — | — | — | — | 30 |
| BHEPF | mol % | — | — | — | 27.5 | 36.8 | 43 | 37.9 | 30 |
| DEG | mol % | — | — | — | — | 10.7 | — | — | — |
| PEG#400 | mol % | — | — | — | — | — | 4.2 | 3 | — |
| [Properties] | | | | | | | | | |
| Standard stretching temperature | ° C. | 134 | 138 | 133 | 142 | 135 | 137 | 143 | 147 |
| Glass transition temperature | ° C. | 124 | 128 | — | — | 135 | 126 | 130 | 132 |
| Refractive index | — | 1.499 | 1.51 | 1.501 | 1.576 | 1.593 | 1.595 | 1.59 | 1.579 |
| Birefringence *1 | — | — | — | — | — | 0.0014 | 0.0012 | 0.0017 | 0.001 |
| Photoelastic coefficient | ×10$^{-12}$ Pa$^{-1}$ | 20 | 9 | — | — | 28 | 28 | 25 | 25 |
| Storage modulus E' (40° C., 1 Hz) | GPa | 2.2 | 2.9 | 2.6 | 2.6 | 2.4 | 2.6 | 2.7 | 2.8 |
| Upper yield stress in tension | MPa | 3.52 | 11.29 | 6.29 | 1.25 | 7.76 | 8.5 | 8.21 | 0.96 |
| Lower yield stress in tension | MPa | 3.39 | 5.99 | 5.76 | 1.25 | 7.01 | 7.75 | 7.36 | 0.95 |
| With respect to expression (2) | — | ○ | x | ○ | ○ | ○ | ○ | ○ | ○ |
| Breaking stress in tension | MPa | 5.48 | 8.24 | 6.44 | 2.68 | 8.22 | 11.7 | 9.6 | 2.77 |
| With respect to expression (3) | — | ○ | x | ○ | ○ | ○ | ○ | ○ | ○ |

○: Polycarbonate resin film satisfied the expression.
x: Polycarbonate resin film did not satisfy the expression.

TABLE 2

| | Unit | Experimental Example 1 | Experimental Example 2 | Experimental Example 3 | Experimental Example 4 | Experimental Example 5 | Experimental Example 6 | Experimental Example 7 |
|---|---|---|---|---|---|---|---|---|
| Polycarbonate resin [Film stretching conditions] | — | A | A | B | C | C | D | A |
| Stretching temperature | °C. | 134 | 134 | 138 | 133 | 133 | 142 | 134 |
| Stretching speed (strain rate) | %/min | 400 | 1000 | 400 | 400 | 1000 | 1000 | 2000 |
| Average thickness | μm | 45.5 | 43.8 | 40.8 | 43.5 | 41.9 | 45.7 | 39.6 |
| Thickness unevenness | μm | 7.1 | 10.9 | 19.2 | 11.8 | 13.3 | 8 | 25.6 |

| | Unit | Experimental Example 8 | Experimental Example 9 | Experimental Example 10 | Experimental Example 11 | Experimental Example 12 |
|---|---|---|---|---|---|---|
| Polycarbonate resin [Film stretching conditions] | — | E | F | F | G | B |
| Stretching temperature | °C. | 135 | 139 | 139 | 143 | 138 |
| Stretching speed (strain rate) | %/min | 400 | 1000 | 400 | 400 | 100 |
| Average thickness | μm | 43.9 | 43.7 | 42.1 | 41.9 | 38.7 |
| Thickness unevenness | μm | 12.2 | 9.8 | 15.4 | 14.3 | 26.4 |

TABLE 3

| | | | Experimental Example 13 | Experimental Example 14 | Experimental Example 15 | Experimental Example 16 | Experimental Example 17 | Experimental Example 18 |
|---|---|---|---|---|---|---|---|---|
| Results of various evaluation | Polycarbonate resin | — | H | F | G | A | G | G |
| | Birefringence *2 | | 0.0023 | 0.0026 | 0.0032 | 0.011 | 0.0032 | 0.0032 |
| | Photoelastic coefficient | $(\times 10^{-12} \, Pa^{-1})$ | 25 | 28 | 25 | 19 | 25 | 25 |
| | R450/R550 | | 0.925 | 0.879 | 0.914 | 1.02 | 0.914 | 0.914 |
| | Stretching method | | free-end | free-end | free-end | free-end | shrinkage + fixed-end | free-end + fixed-end |
| | Water absorption | % | 0.8 | 1.2 | 1.3 | 1.9 | 1.3 | 1.3 |
| | Retardation value | nm | 140 | 140 | 139 | 550 | 141 | 54 |
| | NZ coefficient | | 1 | 1 | 1 | 1 | 0.58 | 5.7 |
| | nx, ny, nz | | nx > ny = nz | nx > ny = nz | nx > ny = nz | nx > ny = nz | nx > ny > nz | nx > nz > ny |
| | Transmittance | % | 92 | 92 | 92 | 93 | 92 | 92 |
| | Thickness | μm | 60 | 54 | 43 | 50 | 130 | 60 |
| | Evaluation of mounting | | ○ | ○ | ○ | x | ○ | ○ |

It can be seen from the results given above that the transparent films formed from polycarbonate resin films of the invention and the transparent films produced by the production process of the invention are excellent films having not only high mechanical strength but also reduced unevenness in film thickness. In particular, it can be seen that use of a polycarbonate resin film which satisfies expressions (2) and (3) and to conduct stretching under stretching conditions which satisfy expression (5) are most preferred.

Incidentally, in the case where there is a polycarbonate resin film which has been produced under unknown conditions, whether or not this film satisfies expression (2) or (3) can be determined by temporarily re-melting the polycarbonate resin film, reproducing a polycarbonate resin film under such conditions that the film is formed from the melt or formed by melt casting, and subjecting this film to a tensile test at the standard stretching temperature for the polycarbonate resin and at a pulling speed (strain rate) of 1,000%/min.

While the invention has been described in detail and with reference to specific embodiments thereof, it will be apparent to one skilled in the art that various changes and modifications can be made therein without departing from the spirit and scope thereof. This application is based on a Japanese patent application filed on Nov. 19, 2009 (Application No. 2009-264337), a Japanese patent application filed on May 27, 2010 (Application No. 2010-121985), and a Japanese patent application filed on Jun. 30, 2010 (Application No. 2010-149799), the contents thereof being incorporated herein by reference.

The invention claimed is:

1. A polycarbonate resin film for film stretching, comprising:
   a polycarbonate resin which comprises at least a constitutional unit derived from a dihydroxy compound (A) that has a bonded structure represented by the structural formula (1) and a constitutional unit derived from at least one dihydroxy compound (B) selected from the group consisting of cyclohexanedimethanol, diethylene glycol and polyethylene glycol,
   wherein said dihydroxyl compound (A) is a compound which has an aromatic group as a side chain and has, in a main chain, ether groups each bonded to an aromatic group,
   said polycarbonate resin having a photoelastic coefficient of $30 \times 10^{-12}$ $Pa^{-1}$ or lower, and
   the polycarbonate resin film satisfies the expression (2) when subjected to a tensile test at a standard stretching temperature for the polycarbonate resin and at a pulling speed (strain rate) of 1,000%/min:

   (1)

wherein no hydrogen atom is bonded to the oxygen atom contained in the structural formula (1); and $0.9 \leq [(\text{lower yield stress in tension})/(\text{upper yield stress in tension})] \leq 1$   (2).

2. The polycarbonate resin film according to claim 1, wherein the polycarbonate resin film satisfies the expression (3) when subjected to a tensile test at the standard stretching temperature for the polycarbonate resin and at a pulling speed (strain rate) of 1,000%/min:

$[(\text{Breaking stress in tension})/(\text{upper yield stress in tension})] \geq 1$   (3).

3. The polycarbonate resin film according to claim 1, wherein said polycarbonate resin further comprises a compound represented by the structural formula (4)

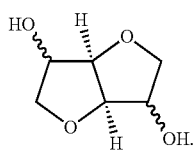   (4)

4. The polycarbonate resin film according to claim 1, wherein the polycarbonate resin has a storage modulus at 40° C. of 2.7 GPa or less.

5. The polycarbonate resin film according to claim 3, wherein the polycarbonate resin is a copolymer which comprises a constitutional unit derived from a compound represented by the structural formula (4) and a constitutional unit derived from 1,4-cyclohexanedimethanol.

6. The polycarbonate resin film according to claim 1, wherein the polycarbonate resin film has a birefringence of 0.001 or higher in the state of having been stretched in a free-end stretch ratio of 2.0 under the conditions of (standard stretching temperature for the polycarbonate resin)+5° C.

7. A transparent film formed by stretching the polycarbonate resin film according to claim 1 in at least one direction.

8. The transparent film according to claim 7, wherein the transparent film has a refractive index as measured with sodium d-line (589 nm) of 1.57-1.62.

9. The transparent film according to claim 7, wherein the transparent film has a birefringence of 0.001 or higher.

10. The transparent film according to claim 7, wherein the transparent film has a retardation R450 measured at a wavelength of 450 nm and a retardation R550 measured at a wavelength of 550 nm, and the ratio of the R450 to the R550 satisfies an expression (6)

$0.75 \leq R450/R550 \leq 1.1$   (6).

11. The transparent film according to claim 7, wherein the transparent film has a photoelastic coefficient of $40 \times 10^{-12}$ $Pa^{-1}$ or less.

12. The transparent film according to claim 7, wherein the transparent film has a thickness of 150 μm or less.

13. The transparent film according to claim 7, wherein the transparent film has refractive indexes, as measured respectively in two in-plane directions, of nx and ny and has a thickness-direction refractive index of nz, and the refractive indexes nx, ny, and nz have a relationship which satisfies any one of expressions (7) to (9)

$nx > ny = nz$   (7)

$nx > ny > nz$   (8)

$nx > nz > ny$   (9).

14. The transparent film according to claim 7, wherein the transparent film has refractive indexes, as measured respectively in two in-plane directions, of nx and ny, a thickness-direction refractive index of nz, and a thickness of d, and the refractive indexes nx, ny, and nz and the thickness d have a relationship which satisfies expressions (10) and (11)

$NZ$ coefficient $= (nx-nz)/(nx-ny) = 0.2$ to $8$   (10)

$\Delta nd = (nx-ny) \cdot d = 30$ to $400$ nm   (11).

15. The transparent film according to claim 7, wherein the transparent film has a water absorption of 0.5-2.0% by weight.

16. A polarizing plate which comprises the transparent film according to claim 7 and a polarizer thereon.

17. A process for producing the transparent film of claim 1 comprising:
    stretching the film in at least one direction under a condition(s) that satisfies the expression (5):

$200\%/\text{min} \leq [\text{stretching speed(strain rate)}] \leq 1,200\%/\text{min}$   (5).

* * * * *